(12) United States Patent
Huang et al.

(10) Patent No.: US 11,297,557 B2
(45) Date of Patent: Apr. 5, 2022

(54) COMMUNICATION METHOD AND COMMUNICATIONS DEVICE

(71) Applicant: HUAWEI TECHNOLOGIES CO., LTD., Guangdong (CN)

(72) Inventors: Yada Huang, Shanghai (CN); Qinghai Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/913,683

(22) Filed: Jun. 26, 2020

(65) Prior Publication Data

US 2020/0329417 A1 Oct. 15, 2020

Related U.S. Application Data

(63) Continuation of application No. PCT/CN2018/123282, filed on Dec. 25, 2018.

(30) Foreign Application Priority Data

Dec. 29, 2017 (CN) .......................... 201711473663.5

(51) Int. Cl.
*H04W 40/02* (2009.01)
*H04L 12/741* (2013.01)
(Continued)

(52) U.S. Cl.
CPC ............. *H04W 40/02* (2013.01); *H04L 45/74* (2013.01); *H04W 4/06* (2013.01)

(58) Field of Classification Search
CPC ......... H04W 40/02; H04W 4/06; H04W 4/70; H04W 4/40; H04W 4/44; H04W 4/46;
(Continued)

(56) References Cited

U.S. PATENT DOCUMENTS 10,117,284 B2 * 10/2018 Kwon .................. H04W 76/14
2007/0248089 A1 * 10/2007 Redi ........................ H04L 45/28
370/392

(Continued)

FOREIGN PATENT DOCUMENTS

CN 104618849 A 5/2015
CN 105430711 A 3/2016
(Continued)

OTHER PUBLICATIONS

3GPP TSG RAN meeting #75,RP-170236:"LTE-based V2X Services",Dubrovnik, Croatia, Mar. 6-9, 2017,total 15 pages.
(Continued)

*Primary Examiner* — Marisol Figueroa
(74) *Attorney, Agent, or Firm* — Womble Bond Dickinson (US) LLP

(57) ABSTRACT

This application provides a communication method and a communications apparatus. The communication method may includes receiving, by a first forwarding device in a mobile network, a first data packet, where the first data packet carries first data from a first terminal device, the first data packet includes a target field, information carried in the target field is used to determine target information. The target information may include information about at least one second terminal device or information about a first area, the second terminal device is a terminal device to which the first data needs to be sent, and the first area is an area to which the first data needs to be broadcast. The communications method may also include sending, by the first forwarding device, a second data packet based on the target information, where the second data packet carries the first data, so that the first forwarding device does not need to send the first data to a device such as a server configured to (Continued)

implement a routing and addressing function, thereby reducing a transmission latency.

16 Claims, 19 Drawing Sheets

(51) Int. Cl.
   *H04W 4/06* (2009.01)
   *H04L 45/74* (2022.01)

(58) Field of Classification Search
   CPC ......... H04W 4/14; H04W 4/02; H04W 40/20; H04L 45/74
   See application file for complete search history.

(56) References Cited

U.S. PATENT DOCUMENTS

| | | |
|---|---|---|
| 2011/0111776 A1 | 5/2011 | Kim et al. |
| 2012/0263089 A1 | 10/2012 | Gupta et al. |
| 2013/0028118 A1 | 1/2013 | Cherian et al. |
| 2014/0362694 A1 | 12/2014 | Rodrigues |
| 2017/0142768 A1 | 5/2017 | Kwon |
| 2018/0091410 A1* | 3/2018 | Browne .............. H04L 41/5009 |

FOREIGN PATENT DOCUMENTS

| | | |
|---|---|---|
| CN | 105450519 A | 3/2016 |
| CN | 106658351 A | 5/2017 |
| CN | 107005476 A | 8/2017 |
| CN | 107040995 A | 8/2017 |
| CN | 107431950 A | 12/2017 |
| EP | 3373605 A1 | 9/2018 |
| JP | 2015523819 A | 8/2015 |
| WO | 2015184610 A1 | 12/2015 |
| WO | 2017049870 A1 | 3/2017 |
| WO | 2017076056 A1 | 5/2017 |

OTHER PUBLICATIONS

3GPP TSG-RAN WG2 #92,Tdoc R2-156633:"Layer-2 protocol stack for PC5-based V2X",Ericsson,Anaheim, USA, 16 Nov. 20, 2015,total 9 pages.

* cited by examiner

COMMUNICATION METHOD AND COMMUNICATIONS DEVICE

CROSS-REFERENCE TO RELATED APPLICATIONS

This application is a continuation of International Application No. PCT/CN2018/123282, filed on Dec. 25, 2018, which claims priority to Chinese Patent Application No. 201711473663.5, filed on Dec. 29, 2017. The disclosures of the aforementioned applications are hereby incorporated by reference in their entireties.

TECHNICAL FIELD

This application relates to the communications field, and more specifically, to a communication method and a communications apparatus.

BACKGROUND

Currently, it is known that in a communications technology, when a terminal device #A needs to send a data packet to a terminal device #B through a mobile network, the terminal device #A needs to send the data packet to an access network device #A that serves the terminal device #A in the mobile network; the access network device #A sends the data packet to a server through a core network device #A; the server obtains a destination address (used to indicate the terminal device #B) of the data packet from an IP layer of the data packet, and may further send, based on the destination address, the data packet to a core network device #B that serves the terminal device #B; the core network device #B may send the data packet to an access network device #B that serves the terminal device #B, so that the access network device #B may send the data packet to the terminal device #B.

In prior approaches, because a data packet is forwarded by a plurality of devices, a transmission latency is relatively high. With development of communications technologies, types of communications services gradually increase, and a service having a relatively high requirement on a transmission latency emerges. For example, an internet of vehicles service requires a relatively low transmission latency. How to reduce a transmission latency is an urgent problem to be resolved in the industry.

SUMMARY

This application provides a communication method and a communications device, to reduce a transmission latency.

According to a first aspect, a communication method is provided. The communication method includes: receiving, by a first forwarding device in a mobile network, a first data packet, where the first data packet carries first data from a first terminal device, the first data packet includes a target field, information carried in the target field is used to determine target information; the target information includes information about at least one second terminal device or information about a first area, the second terminal device is a terminal device to which the first data needs to be sent, and the first area is an area to which the first data needs to be broadcast; and sending, by the first forwarding device, a second data packet based on the target information, where the second data packet carries the first data.

According to the solution in this embodiment of this application, the first forwarding device obtains, from the data packet carrying the first data, the information about the terminal device or the area to which the first data needs to be sent, so that the first data can be sent to the terminal device or the area based on the information, so that the first forwarding device does not need to send the first data to a device such as a server configured to implement a routing and addressing function, thereby reducing a transmission latency.

Optionally, the target field is located in a protocol data unit PDU at a first protocol layer corresponding to the first data packet; and the first protocol layer includes at least one of a packet data convergence protocol PDCP layer, a radio link control RLC layer, and a media access control MAC layer.

Therefore, the forwarding device can obtain the information carried in the target field only by parsing the data packet at layer 2. Compared with a manner of obtaining routing information, such as an IP address of the data packet, from layer 3 of the data packet, a parsing entity for the layer 3 does not need to be configured in the forwarding device, thereby reducing processing burden of the forwarding device and improving compatibility and practicability of this application.

Optionally, the target field carries the target information.

Optionally, when the information carried in the target field is empty or a specified preset value, the method further includes: determining, by the first forwarding device, the target information based on information about the first terminal device.

Optionally, the information about the first terminal device includes at least one of context information of the first terminal device, location information of the first terminal device, and cell information of a cell in which the first terminal device is located.

Optionally, the information about the first terminal device includes identification information of the first terminal device.

Optionally, the information about the first terminal device includes indication information of a bearer corresponding to the first terminal device.

Optionally, the method further includes: obtaining, by the first forwarding device, mapping relationship information, where the mapping relationship information is used to indicate a correspondence between information about at least one terminal device and at least one piece of routing information; and the determining, by the first forwarding device, the target information based on information about the first terminal device includes: determining, by the first forwarding device as the target information, routing information that is indicated by a mapping relationship and that corresponds to the information about the first terminal device.

When determining that the information carried in the target field is empty or a specified preset value, the forwarding device determines the target information based on the information about the first terminal device, so that the terminal device can complete the process of this application without adding the target information to the data packet, thereby reducing processing burden of the terminal device and improving compatibility and practicability of this application.

Optionally, the information about the second terminal device includes a device identifier of the second terminal device or a group identifier of a terminal device group to which the second terminal device belongs.

Optionally, the information about the first area includes mobile network information of the first area or geographical location information of the first cell.

Optionally, when the first forwarding device can communicate with the second terminal device, the sending, by the first forwarding device, a second data packet based on the target information includes: sending, by the first forwarding device, the second data packet to a second terminal device based on the target information.

Optionally, when coverage of the second forwarding device includes the first area, the sending, by the first forwarding device, a second data packet based on the target information includes: broadcasting, by the first forwarding device, the second data packet to the first area based on the target information.

Optionally, when the first forwarding device cannot communicate with the second terminal device, or coverage of the second forwarding device includes the first area, the sending, by the first forwarding device, a second data packet based on the target information includes: sending, by the first forwarding device, the second data packet to a second forwarding device in the mobile network based on the target information, where the second forwarding device can communicate with the second terminal device, or the coverage of the second forwarding device includes the first area.

Optionally, before the sending, by the first forwarding device, the second data packet to a second forwarding device, the method further includes:

encapsulating, by the first forwarding device, quality of service QoS information corresponding to the first data and/or sending time information of the first data into the second data packet.

Therefore, the second forwarding device can determine, from the second data packet, the QoS information and the sending time information that correspond to the first data, and send the first data based on the QoS information and the sending time information, thereby meeting a requirement of the first data on QoS and a sending time and improving user experience.

Optionally, before the sending, by the first forwarding device, a second data packet based on the target information, the method further includes: determining, by the first forwarding device as the second forwarding device, a forwarding device that is indicated by configuration information and that serves the second terminal device, where the configuration information is used to indicate a terminal device served by each of a plurality of forwarding devices including the second forwarding device.

Optionally, before the sending, by the first forwarding device, a second data packet based on the target information, the method further includes: determining, by the first forwarding device as the second forwarding device, a forwarding device that is indicated by configuration information and whose coverage includes the first area, where the configuration information is used to indicate an area covered by each of a plurality of forwarding devices including the second forwarding device.

Optionally, the configuration information is obtained by the first forwarding device from a control device, the configuration information is determined by the control device based on status information reported by each of the plurality of forwarding devices, and the status information reported by each forwarding device is used to indicate a terminal device served by the forwarding device or an area covered by the forwarding device.

Therefore, the first forwarding device can easily determine the second forwarding device based on the target information, thereby further improving practicability and reliability of this application.

Optionally, a plurality of ports are configured in the first forwarding device, and each port is used for communication between the first forwarding device and at least one forwarding device; and the sending, by the first forwarding device, the second data packet to a second forwarding device in the mobile network based on the target information includes: determining, by the first forwarding device, a first port from the plurality of ports based on the target information, where the first port is used for communication between the first forwarding device and the second forwarding device; and sending, by the first forwarding device, the second data packet to the second forwarding device through the first port.

Optionally, the second forwarding device includes an access network device or a core network device in communication connection with the second terminal device, or the second forwarding device includes an access network device or a core network device located in the first area.

Optionally, the first forwarding device includes an access network device or a core network device in communication connection with the first terminal device.

According to a second aspect, a communication method is provided. The communication method includes: generating, by a first terminal device, a first data packet, where the first data packet carries first data, the first data packet includes a target field, information carried in the target field is used to determine target information; the target information includes information about at least one second terminal device or information about a first area, the second terminal device is a terminal device to which the first data needs to be sent, and the first area is an area to which the first data needs to be broadcast; and sending, by the first terminal device, the first data packet to a first forwarding device in a mobile network.

According to the solution in this embodiment of this application, the target field is added to the data packet, and information carried in the target field may be used to determine the second terminal device or the first area to which the first data needs to be sent. Therefore, the forwarding device can send the data in the data packet to the second terminal device or the first area based on the target information, so that the forwarding device does not need to send the data to a device such as a server configured to implement a routing and addressing function, thereby reducing a transmission latency.

Optionally, the target field is located in a protocol data unit PDU at a first protocol layer corresponding to the first data packet; and the first protocol layer includes at least one of a packet data convergence protocol PDCP layer, a radio link control RLC layer, and a media access control MAC layer.

Optionally, the target field carries the target information.

Optionally, the information carried in the target field is empty or a specified preset value, the target information is determined by the first forwarding device based on information about the first terminal device, the information about the first terminal device includes at least one of context information of the first terminal device, location information of the first terminal device, and cell information of a cell in which the first terminal device is located.

Optionally, the information about the second terminal device includes a device identifier of the second terminal device or a group identifier of a terminal device group to which the second terminal device belongs.

Optionally, the information about the first area includes mobile network information of the first area or geographical location information of the first cell.

According to a third aspect, a communication method is provided. The communication method includes: determining, by a first forwarding device in a mobile network, target information based on information about a first terminal device when receiving a first data packet carrying first data from the first terminal device, where the target information is used to indicate at least one second terminal device, or the target information is used to indicate at least one first area, the second terminal device is a terminal device to which the first data needs to be sent, and the first area is an area to which the first data needs to be broadcast; and sending, by the first forwarding device, a second data packet based on the target information, where the second data packet carries the first data.

According to the solution in this embodiment of this application, the first forwarding device obtains, based on the information about the first terminal device, the information about the terminal device or the area to which the first data needs to be sent, so that the first forwarding device can send the first data to the terminal device or the area based on the information, so that the first forwarding device does not need to send the first data to a device such as a server configured to implement a routing and addressing function, thereby reducing a transmission latency.

Optionally, the information about the first terminal device includes at least one of context information of the first terminal device, location information of the first terminal device, and cell information of a cell in which the first terminal device is located.

Optionally, the information about the first terminal device includes identification information of the first terminal device.

Optionally, the information about the first terminal device includes indication information of a bearer corresponding to the first terminal device.

Optionally, the method further includes: obtaining, by the first forwarding device, mapping relationship information, where the mapping relationship information is used to indicate a correspondence between information about at least one terminal device and at least one piece of routing information; and the determining, by the first forwarding device, the target information based on information about the first terminal device includes: determining, by the first forwarding device as the target information, routing information that is indicated by a mapping relationship and that corresponds to the information about the first terminal device.

Optionally, the information about the second terminal device includes a device identifier of the second terminal device or a group identifier of a terminal device group to which the second terminal device belongs.

Optionally, the information about the first area includes mobile network information of the first area or geographical location information of the first cell.

Optionally, when the first forwarding device can communicate with the second terminal device, the sending, by the first forwarding device, a second data packet based on the target information includes: sending, by the first forwarding device, the second data packet to a second terminal device based on the target information.

Optionally, when coverage of the second forwarding device includes the first area, the sending, by the first forwarding device, a second data packet based on the target information includes: broadcasting, by the first forwarding device, the second data packet to the first area based on the target information.

Optionally, when the first forwarding device cannot communicate with the second terminal device, or coverage of the second forwarding device includes the first area, the sending, by the first forwarding device, a second data packet based on the target information includes: sending, by the first forwarding device, the second data packet to a second forwarding device in the mobile network based on the target information, where the second forwarding device can communicate with the second terminal device, or the coverage of the second forwarding device includes the first area.

Optionally, before the sending, by the first forwarding device, the second data packet to a second forwarding device, the method further includes:

encapsulating, by the first forwarding device, quality of service QoS information corresponding to the first data and/or sending time information of the first data into the second data packet.

Therefore, the second forwarding device can determine, from the second data packet, the QoS information and the sending time information that correspond to the first data, and send the first data based on the QoS information and the sending time information, thereby meeting a requirement of the first data on QoS and a sending time and improving user experience.

Optionally, before the sending, by the first forwarding device, a second data packet based on the target information, the method further includes: determining, by the first forwarding device as the second forwarding device, a forwarding device that is indicated by configuration information and that serves the second terminal device, where the configuration information is used to indicate a terminal device served by each of a plurality of forwarding devices including the second forwarding device.

Optionally, before the sending, by the first forwarding device, a second data packet based on the target information, the method further includes: determining, by the first forwarding device as the second forwarding device, a forwarding device that is indicated by configuration information and whose coverage includes the first area, where the configuration information is used to indicate an area covered by each of a plurality of forwarding devices including the second forwarding device.

Optionally, the configuration information is obtained by the first forwarding device from a control device, the configuration information is determined by the control device based on status information reported by each of the plurality of forwarding devices, and the status information reported by each forwarding device is used to indicate a terminal device served by the forwarding device or an area covered by the forwarding device.

Therefore, the first forwarding device can easily determine the second forwarding device based on the target information, thereby further improving practicability and reliability of this application.

Optionally, a plurality of ports are configured in the first forwarding device, and each port is used for communication between the first forwarding device and at least one forwarding device; and the sending, by the first forwarding device, the second data packet to a second forwarding device in the mobile network based on the target information includes: determining, by the first forwarding device, a first port from the plurality of ports based on the target information, where the first port is used for communication between the first forwarding device and the second forwarding device; and sending, by the first forwarding device, the second data packet to the second forwarding device through the first port.

Optionally, the second forwarding device includes an access network device or a core network device in communication connection with the second terminal device, or the second forwarding device includes an access network device or a core network device located in the first area.

Optionally, the first forwarding device includes an access network device or a core network device in communication connection with the first terminal device.

According to a fourth aspect, a communications apparatus is provided. The communications apparatus includes units configured to perform the steps of the communication method in the first aspect or the third aspect and the implementations of the first aspect or the third aspect.

In a design, the communications apparatus is a communications chip, and the communications chip may include an input circuit or interface configured to send information or data, and an output circuit or interface configured to receive information or data.

In another design, the communications apparatus is a mobile network device (for example, a core network device or an access network device), and a communications chip may include a transmitter configured to send information or data and a receiver configured to receive information or data.

According to a fifth aspect, a communications apparatus is provided. The communications apparatus includes units configured to perform the steps of the communication method in the second aspect and the implementations of the second aspect.

In a design, the communications apparatus is a communications chip, and the communications chip may include an input circuit or interface configured to send information or data, and an output circuit or interface configured to receive information or data.

In another design, the communications apparatus is a terminal device, and a communications chip may include a transmitter configured to send information or data and a receiver configured to receive information or data.

According to a sixth aspect, a forwarding device is provided. The forwarding device includes a processor and a memory. The memory is configured to store a computer program, and the processor is configured to invoke the computer program from the memory and run the computer program, so that the communications device performs the communication method in the first aspect or the third aspect and the implementations of the first aspect or the third aspect.

Optionally, there are one or more processors and one or more memories.

Optionally, the memory may be integrated into the processor, or the memory and the processor are separately disposed.

Optionally, the forwarding device further includes a transmitter and a receiver.

According to a seventh aspect, a terminal device is provided. The terminal device includes a processor and a memory. The memory is configured to store a computer program, and the processor is configured to invoke the computer program from the memory and run the computer program, so that the communications device performs the communication method in the second aspect and the implementations of the second aspect.

Optionally, there are one or more processors and one or more memories.

Optionally, the memory may be integrated into the processor, or the memory and the processor are separately disposed.

Optionally, the terminal device further includes a transmitter and a receiver.

According to an eighth aspect, a communications system is provided. The communication system includes the terminal device and the forwarding device.

According to a ninth aspect, a computer program product is provided. The computer program product includes a computer program (which may also be referred to as code or an instruction). When the computer program is run, a computer is enabled to perform the method in any one of the possible implementations of the first aspect to the third aspect.

According to a tenth aspect, a computer-readable medium is provided. The computer-readable medium stores a computer program (which may also be referred to as code or an instruction). When the computer program is run on a computer, the computer is enabled to perform the method in any one of the possible implementations of the first aspect to the third aspect.

According to an eleventh aspect, a chip system is provided. The chip system includes a memory and a processor. The memory is configured to store a computer program, and the processor is configured to invoke the computer program from the memory and run the computer program, so that a communications device on which the chip system is installed performs the method in any one of the possible implementations of the first aspect to the third aspect.

The chip system may include an input circuit or interface configured to send information or data, and an output circuit or interface configured to receive information or data.

According to a twelfth aspect, a communications system is provided. The communication system includes the terminal device and/or the forwarding device.

In a possible design, the communications system may further include another device interacting with the terminal device or the forwarding device in the solutions provided in the embodiments of this application.

According to the solutions in the embodiments of this application, the first forwarding device obtains, based on the information about the first terminal device, the information about the terminal device or the area to which the first data needs to be sent, so that the first forwarding device can send the first data to the terminal device or the area based on the information, so that the first forwarding device does not need to send the first data to a device such as a server configured to implement a routing and addressing function, thereby reducing a transmission latency.

DESCRIPTION OF EMBODIMENTS

Figure 1:
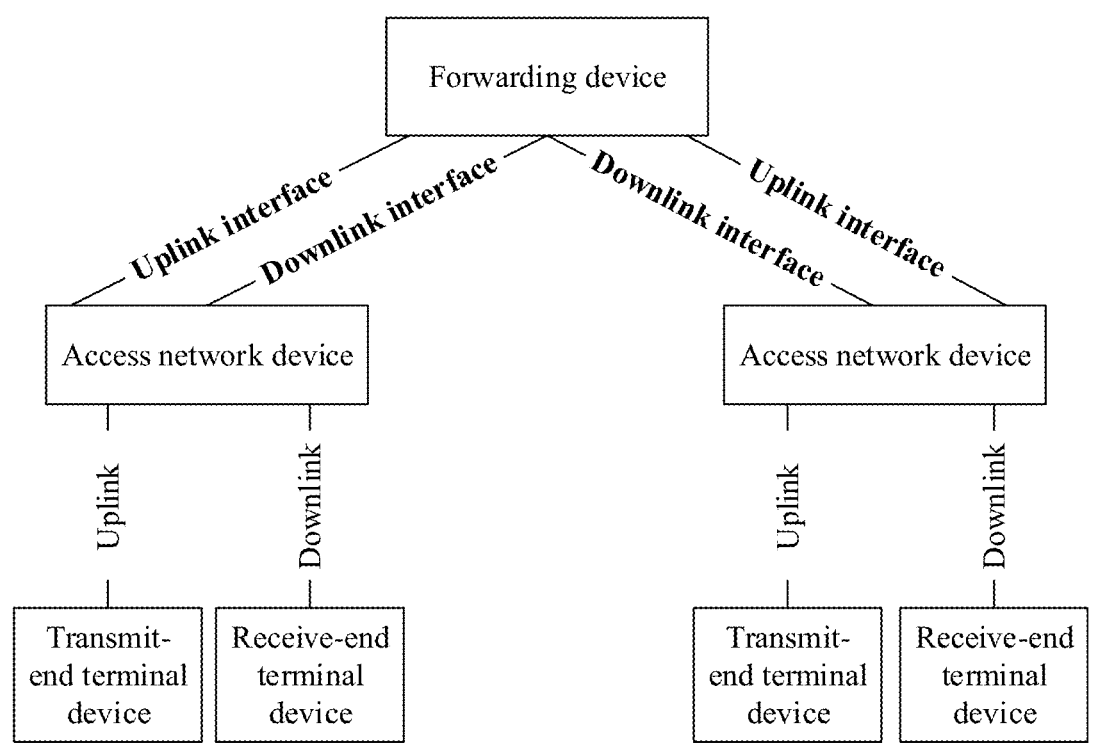
FIG. 1 is a schematic diagram of an example of a configuration manner of a forwarding device according to this application.

The following describes the technical solutions of this application with reference to the accompanying drawings.

Terminologies such as "component", "module", and "system" used in this application are used to indicate computer-related entities, hardware, firmware, combinations of hardware and software, software, or software being executed. For example, a component may be, but is not limited to, a process that is run on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable mediums that store various data structures. The components may communicate by using, for example, a local and/or remote process and based on a signal having one or more data packets (for example, data from two components interacting with another component in a local system, a distributed system, and/or across a network such as the Internet interacting with other systems by using a signal).

The technical solutions of the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

Generally, a quantity of connections supported by a conventional communications system is limited and easy to implement. However, with development of communications technologies, a mobile communications system not only supports conventional communication, but also supports, for example, device to device (D2D) communication, machine to machine (M2M) communication, machine type communication (MTC), and vehicle to everything (V2X) communication, for example, vehicle to vehicle (V2V) communication, and vehicle to infrastructure (V2I) communication, vehicle to pedestrian (V2P) communication, and vehicle to network (V2N) communication.

The embodiments of this application are described with reference to a terminal device. The terminal device may also be referred to as user equipment (UE). an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a WLAN, and may be a cellular phone, a cordless phone, a session initiation protocol (SIP) phone, a wireless local loop (WLL) station, a personal digital assistant (PDA) device, a handheld device with a wireless communication function, a computing device, another processing device connected to a wireless modem, a vehicle-mounted device, an internet of vehicles terminal, a computer, a laptop computer, a handheld communications device, a handheld computing device, a satellite wireless device, a wireless modem card, a television set-top box (STB), customer premises equipment (CPE), and/or other devices configured to communicate on a wireless system, and a next generation communications system, for example, a terminal device in a 5G network and a terminal device in a future evolved public land mobile network (PLMN).

By way of example, and not limitation, in the embodiments of this application, the terminal device may alternatively be a wearable device. A wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, in the embodiments of this application, the terminal device may alternatively be a terminal device in an internet of things (IoT) system. IoT is an important component of future development of information technologies, and a main technical feature of IoT is to connect a thing to a network by using a communications technology, thereby implementing an intelligent network for interconnection between a person and a machine or between one thing and another.

The embodiments of this application are described with reference to a forwarding device. In the embodiments of this application, the forwarding device may be an entity or a module that has a forwarding function. Subsequently, functions of the forwarding device are described in detail with reference to a data transmission process.

The following describes in detail a configuration manner of the forwarding device in the embodiments of this application. In the embodiments of this application, the forwarding device is configured in a mobile network. In other words, the forwarding device may be a network element in a mobile network, or the forwarding device may be a function module on a network element in a mobile network.

By way of example, and not limitation, the forwarding device may be configured in any one of the following manners.

Manner 1

In the embodiments of this application, the forwarding device may be configured on an access network device or the forwarding device may be an access network device. In other words, the access network device may have a function of the forwarding device in this application, and may perform an action of the forwarding device.

An access network (AN) includes a series of transport entities (such as line equipment and transmission facilities) between a service node interface SNI) and a user-to-network interface (user network interface, UNI), is an implementation system that provides a required transport bearer capability to provide a telecommunications service, and can be configured and managed through a management interface (e.g., a Q3 inteface). In principle, types and quantities of UNIs and SNIs that can be implemented by the access network are not limited. The access network does not interpret signaling. The access network can be considered as a transport network irrelevant to services and applications. The access network mainly completes cross-connection, multiplexing, and transmission functions.

The access network device may include an access network/radio access network (RAN) device. A radio access network is a network including a plurality of 5G-RAN nodes. The 5G-RAN node may be an access point (AP), a next-generation new base station (NR nodeB, gNB), a next-generation evolved NodeB (ng-eNB, gNB), a transmission reception point (TRP), a transmission point (TP), or another access node. The 5G-RAN node may be further divided into a central unit (CU) and a distributed unit (DU).

In addition, the access network device may further be a base transceiver station (BTS) in SM or CDMA, or may be a NodeB (NB) in WCDMA, or may be an evolved NodeB (eNB or eNodeB) in LTE, or may be a relay station, an access point, a vehicle-mounted device, a wearable device, an access network device in a future 5G network, or an access network device in a future evolved PLMN network. This is not particularly limited in this application.

It should be noted that in the embodiments of this application, the access network device provides a service for a cell, and the terminal device communicates with the access network device by using a transmission resource (for example, a frequency domain resource or a spectrum resource) used by the cell. The cell may be a cell corresponding to the access network device (for example, a base station). The cell may belong to a macro base station or a base station corresponding to a small cell (Small cell). The small cell herein may include a metro cell, a micro cell, a pico cell, a femto cell, or the like. These small cells feature small coverage and low transmit power, and are suitable for providing a high-rate data transmission service.

In addition, in an LTE system or a 5G system, a plurality of cells may simultaneously work on a carrier at a same frequency. In some special scenarios, it may also be considered that the concept of carrier is equivalent to the concept of cell. For example, in a carrier aggregation (CA) scenario, when a secondary component carrier is configured for UE, a carrier index of the secondary component carrier and a cell identity (Cell ID) of a secondary serving cell operating on the secondary component carrier are both carried. In this case, it may be considered that the concept of carrier is equivalent to that of cell. For example, access of the UE to a carrier is equivalent to access to a cell.

Manner 2

In the embodiments of this application, the forwarding device may be configured on a core network device or the forwarding device may be a core network device. In other words, the core network device may have a function of the forwarding device in this application, and may perform an action of the forwarding device.

Main functions of a core network are to provide a user connection, manage a user, complete service carrying, and act as a bearer network to provide an interface to an external network. User connection establishment includes functions such as mobility management (MM), call management (CM), switching/routing, and recording notification. User management includes user description, quality of service (QoS), a user communication record (e.g., accounting), a virtual home environment (VHE), and security (an authentication center provides corresponding security measures, including security management for a mobile service and security processing for access to an external network). A bearer connection (access) includes a public switched telephone network (PSTN) that provides access to the outside, an external circuit data network and an external packet data network, the Internet, an intranet, a short message service (SMS) server of a mobile network, and the like.

Basic services that can be provided by the core network include mobile office, e-commerce, communications, an entertainment service, a travel and location-based service, a remote sensing service (e.g., telemetry), a simple message transfer service (e.g., monitoring control), or the like.

By way of example, and not limitation, the core network device may include function units such as an access and mobility management function (AMF), a session management function (SMF), a policy control function (PCF), and a user plane function (UPF). These function units may work independently, or may be combined to implement some control functions. For example, the AMF, the SMF, and the PCF may be combined as a management device, to complete access control and mobility management functions such as access authentication, security encryption, and location registration of a terminal device, session management functions such as establishment, release, and change of a user plane transmission path, and functions of analyzing some slice related data (such as congestion) and terminal device related data. The UPF mainly completes functions such as routing and forwarding of user plane data, for example, is responsible for filtering data packets of a terminal device, transmitting/forwarding data, controlling a rate, and generating charging information.

Manner 3

Alternatively, the forwarding device may be a device independently configured in a mobile network. In addition, the forwarding device may be in communication connection with an access network device or a core network device (for example, connection in a wired manner or a wireless manner), so that the forwarding device can communicate with a terminal device through the access network device or the core network device.

It should be understood that the listed configuration manners of the forwarding device are merely examples for description. This application is not limited thereto. When a function of the forwarding device in this application can be implemented, a specific configuration form of the forwarding device may be randomly changed. For example, the forwarding device may alternatively be configured in a device such as a gateway device or a router.

In addition, a plurality of forwarding devices may be configured in a mobile network, and different forwarding devices may be in communication connection with each other (for example, connection in a wired manner or a wireless manner).

In the embodiments of this application, data transmission between two terminal devices (denoted as a terminal device #1 and a terminal device #2 without loss of generality) in a mobile network requires forwarding by at least one forwarding device. In other words, it is assumed that the terminal device #1 is in communication with a forwarding device #1, and the communication connection between the terminal device #1 and the forwarding device #1 may be a direct connection or an indirect connection. For example, the terminal device #1 and the forwarding device #1 may communicate with each other by using an access network device or a core network device. Therefore, when the terminal device #1 needs to send data #1 to the terminal device #2, the terminal device #1 may send the data #1 to the forwarding device #1.

In the embodiments of this application, there may be the following two cases in the foregoing process of sending the data #1.

Case 1

If the forwarding device #1 can directly communicate with an access network device or a core network device that serves the terminal device #2, the forwarding device #1 may send the data #1 to the access network device or the core network device that serves the terminal device #2.

FIG. 1 shows an example of a possible configuration manner of the forwarding device #1 in the mobile network in the case 1.

As shown in FIG. 1, the forwarding device #1 may be in communication connection with an access network device #1 and an access network device #2 (access network devices that serve the terminal device #2).

It should be understood that the configuration manner shown in FIG. 1 is merely an example of description of a configuration manner that can implement the case 1. This application is not particularly limited thereto. For example, the forwarding device #1 may be in communication connection with the access network device #1 by using a core network device, or the forwarding device #1 may be in communication connection with the access network device #2 by using a core network device.

In addition, although FIG. 1 shows only a case in which the forwarding device #1 is connected to the two access network devices, this application is not limited thereto. The forwarding device #1 may be connected to any quantity of access network devices.

In addition, in this embodiment of this application, a communications interface may be configured between the forwarding device and an access network. The communications interface may be similar to an interface configured to implement communication between network elements in a mobile network in existing systems. To avoid repetition, detailed descriptions thereof are omitted herein.

Case 2

If the forwarding device #1 cannot directly communicate with the terminal device #2 (or the access network device or the core network device that serves the terminal device #2), the forwarding device #1 may send the data #1 to a forwarding device #2 that can communicate with the terminal device #2, and the forwarding device #2 sends the data #1 to the terminal device #2. The terminal device #2 is in communication connection with the forwarding device #2, and the communication connection between the terminal device #2 and the forwarding device #2 may be a direct connection or an indirect connection. For example, the terminal device #2 may communicate with the forwarding device #2 by using an access network device or a core network device.

In other words, in this embodiment of this application, a plurality of (two or more) forwarding devices in the mobile network may be in communication connection with each other.

The following uses a configuration relationship between the forwarding device #1 and the forwarding device #2 as an example to describe configuration manners of the two forwarding devices that can (directly or indirectly) communicate in this application.

Figure 2:
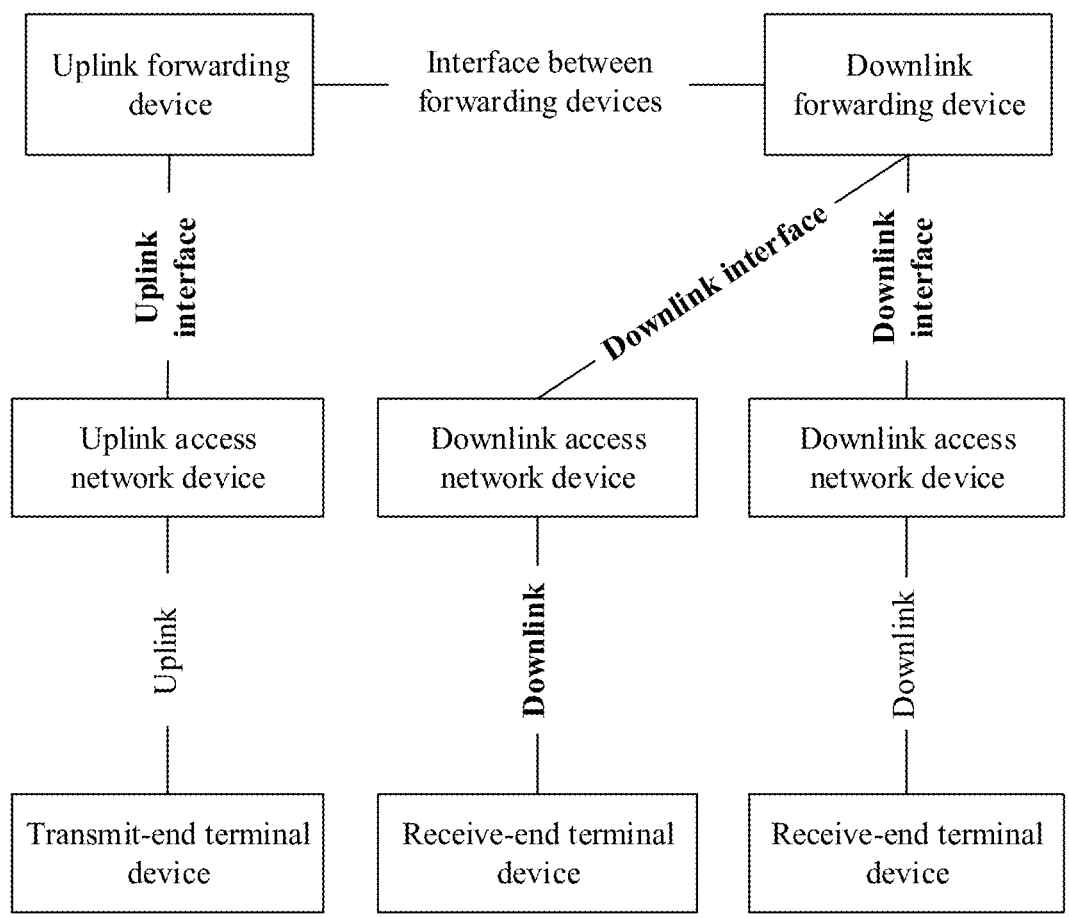
FIG. 2 is a schematic diagram of another example of a configuration manner of a forwarding device according to this application.
Figure 3:
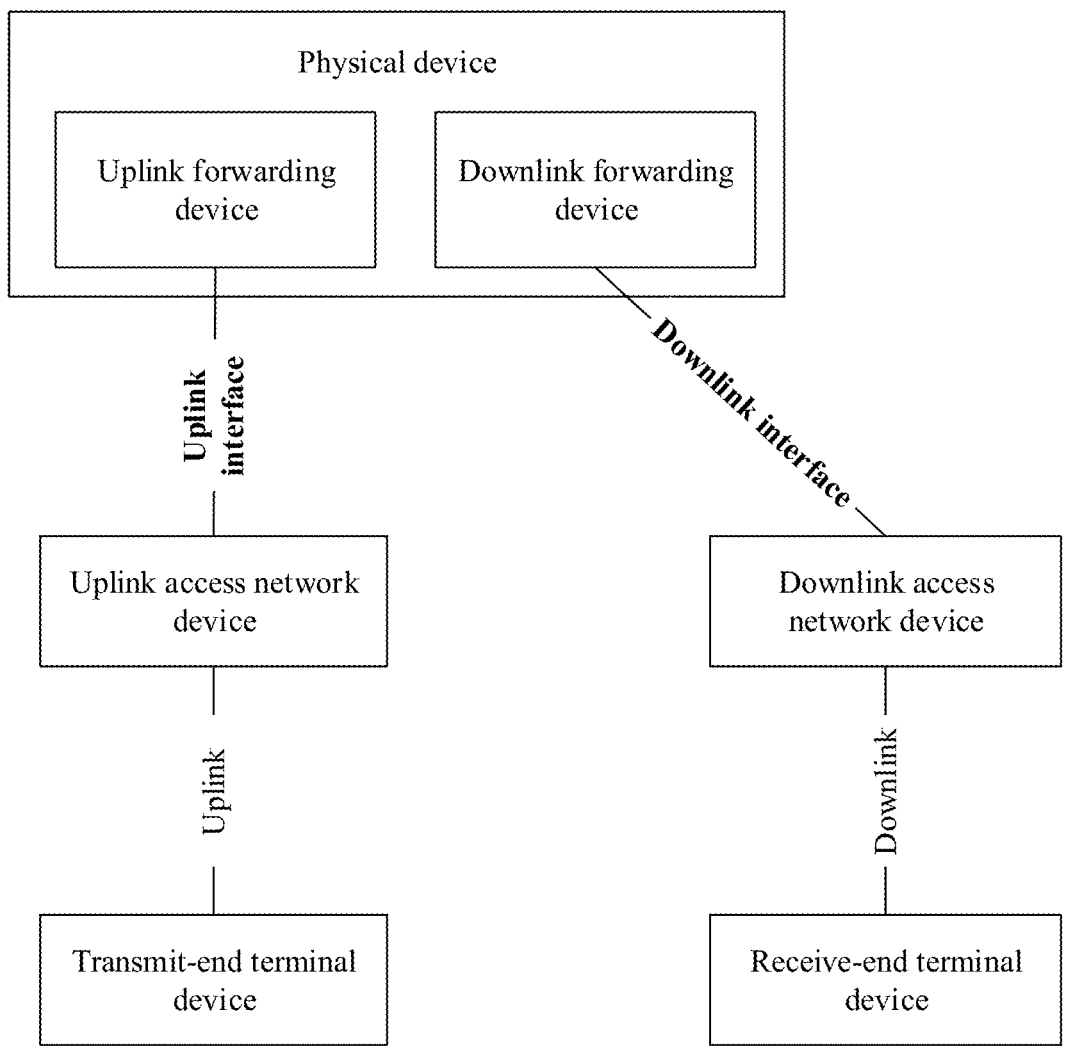
FIG. 3 is a schematic diagram of still another example of a configuration manner of a forwarding device according to this application.

FIG. 2 shows an example of a possible configuration manner of the forwarding device #1 and the forwarding device #2 in the mobile network in the case 2. As shown in FIG. 3, the forwarding device #1 and the forwarding device #2 may be independently disposed, and the forwarding device #1 and the forwarding device #2 may be in communication connection with each other by using a cable. Alternatively, the forwarding device #1 and the forwarding device #2 may be in communication connection with each other in a wireless communication manner. For example, a communications interface may be configured between the forwarding device #1 and the forwarding device #2. The communications interface may be similar to an interface configured to implement communication between network elements in a mobile network in existing systems. To avoid repetition, detailed descriptions thereof are omitted herein.

In the manner shown in FIG. 2, the forwarding device #1 and the access network device #1 may be independently configured. In this case, the forwarding device #1 may be, for example, a core network device, or the forwarding device #1 may be an entity independent of the core network device.

In addition, a configuration relationship between the forwarding device #2 and the access network device #2 may be similar to a configuration relationship between the forwarding device #1 and the access network device #1.

In addition, a quantity of access network devices connected to one forwarding device shown in FIG. 2 is merely an example for description. This application is not limited thereto. The forwarding device may be connected to any quantity of access network devices.

FIG. 3 shows another example of a possible configuration manner of the forwarding device #1 and the forwarding device #2 in the mobile network in the case 2. Different from the configuration manner shown in FIG. 2, in the configuration manner shown in FIG. 3, the forwarding device #1 and the forwarding device #2 may be configured in a same physical device (or a physical device), for example, a core network device. In addition, in this case, the forwarding device #1 and the forwarding device #2 may be in communication connection with each other by using, for example, an internal bus.

Figure 4:
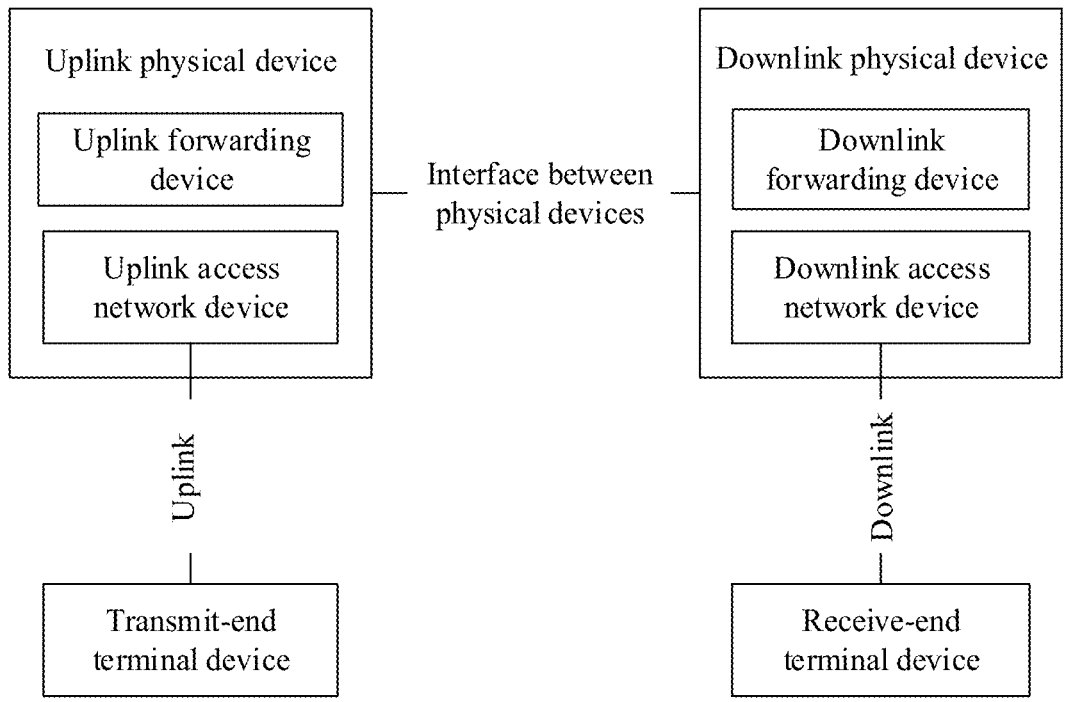
FIG. 4 is a schematic diagram of still another example of a configuration manner of a forwarding device according to this application.

FIG. 4 shows still another example of a possible configuration manner of the forwarding device #1 and the forwarding device #2 in the mobile network in the case 2. Different from the configuration manner shown in FIG. 2, in the configuration manner shown in FIG. 4, the forwarding device #1 and the access network device #1 may be configured in a same entity device. In addition, in this case, the forwarding device #1 and the access network device #1 may be in communication connection with each other by using, for example, an internal bus. Similarly, the forwarding device #2 and the access network device #2 may be configured in a same entity device.

Figure 5:
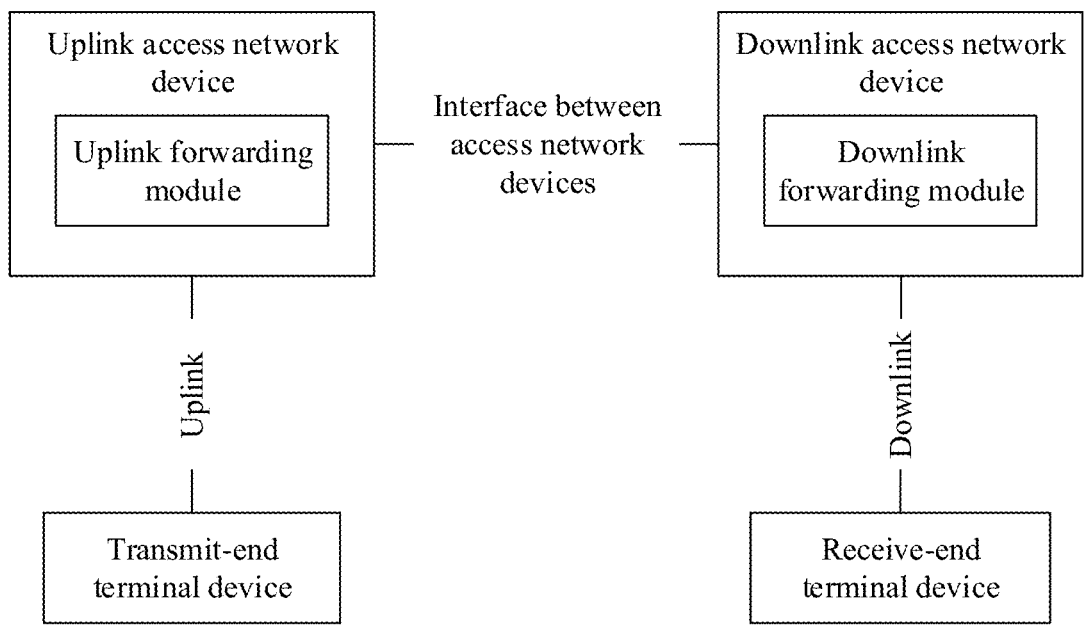
FIG. 5 is a schematic diagram of still another example of a configuration manner of a forwarding device according to this application.

FIG. 5 shows still another example of a possible configuration manner of the forwarding device #1 and the forwarding device #2 in the mobile network in the case 2. Different from the configuration manner shown in FIG. 2, in the configuration manner shown in FIG. 5, the forwarding device #1 and the access network device #1 may be different function modules of a same entity.

Figure 6:
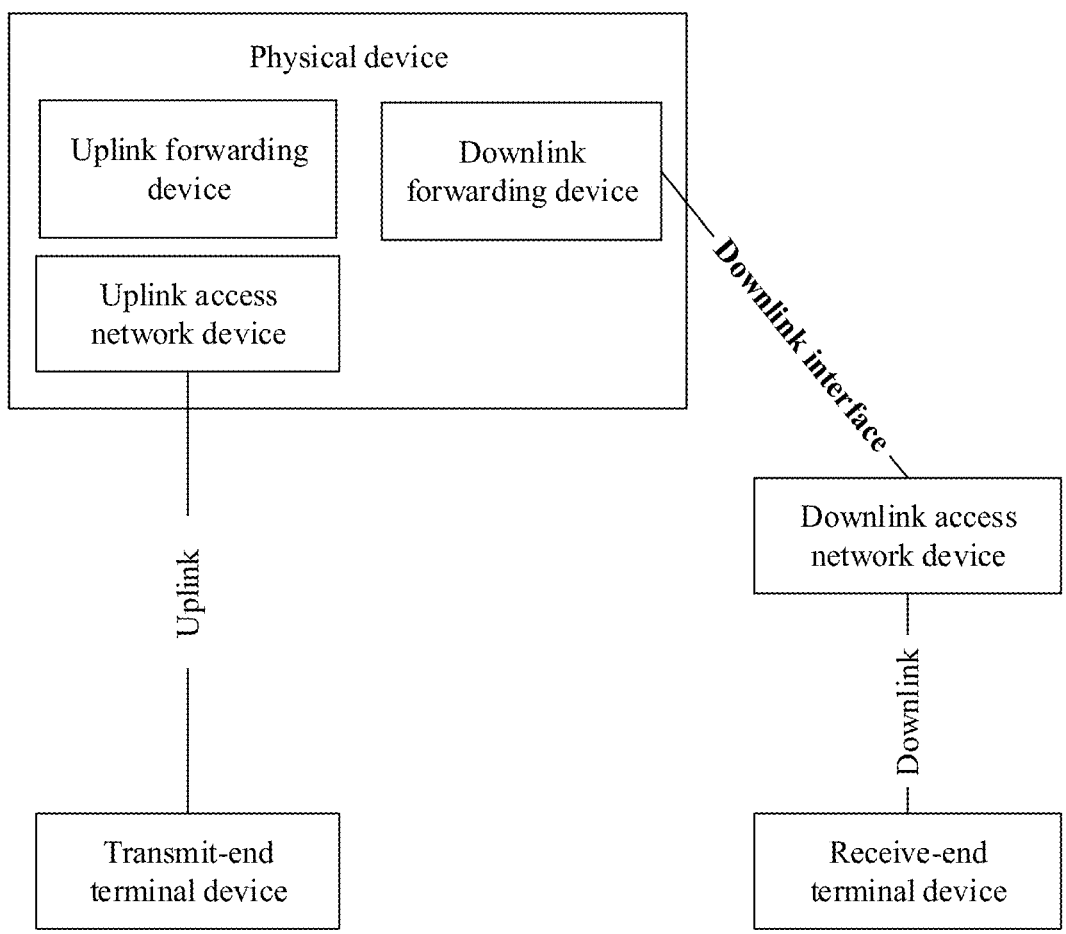
FIG. 6 is a schematic diagram of still another example of a configuration manner of a forwarding device according to this application.

FIG. 6 shows still another example of a possible configuration manner of the forwarding device #1 and the forwarding device #2 in the mobile network in the case 2. Different from the configuration manner shown in FIG. 2, in the configuration manner shown in FIG. 6, the forwarding device #1, the access network device #1, and the forwarding device #2 may be configured in a same entity device, and the access network device #2 and the entity device may be independently deployed. Similarly, the forwarding device #2, the access network device #1, and the forwarding device #2 may be configured in a same entity device, and the access network device #1 and the entity device may be independently deployed.

Figure 7:
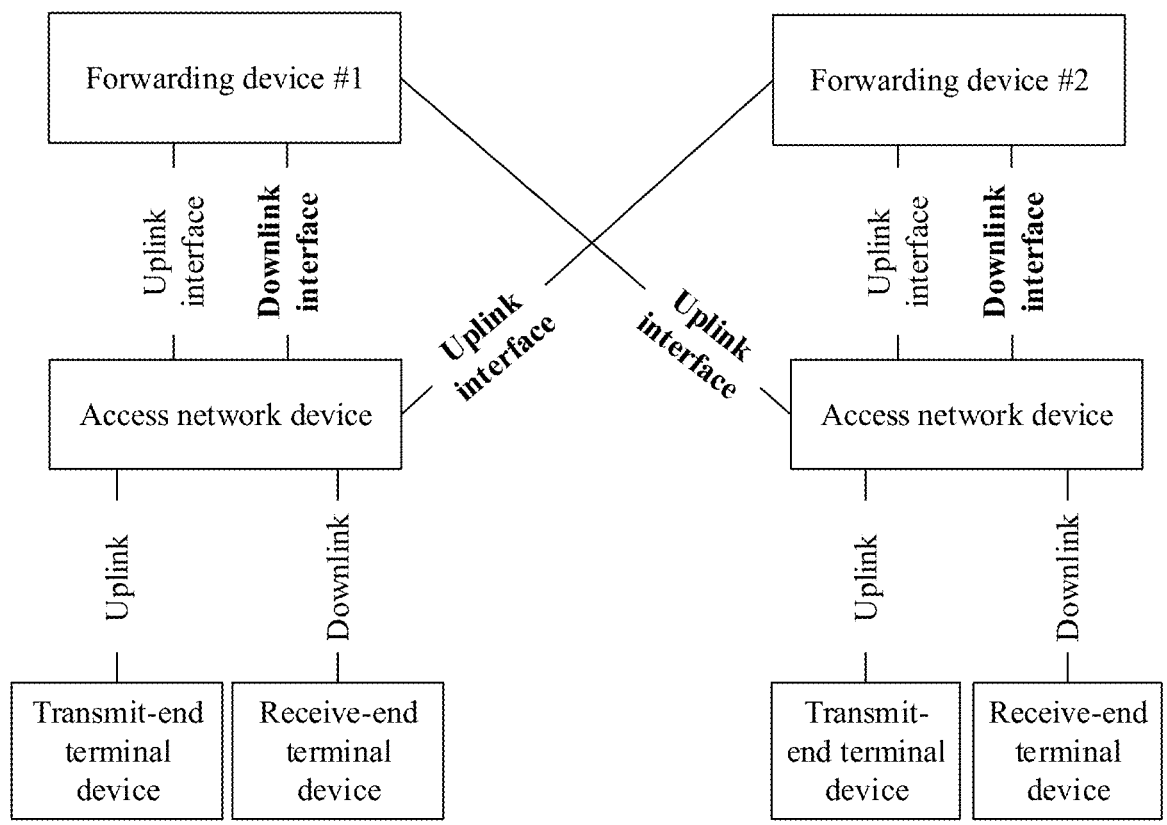
FIG. 7 is a schematic diagram of still another example of a configuration manner of a forwarding device according to this application.

It should be understood that the foregoing enumerated manners of enabling a plurality of (e.g., two or more) forwarding devices in the mobile network to be in communication connection with each other are merely a possible manner of implementing data transmission between different terminal devices. This application is not limited thereto. For example, as shown in FIG. 7, alternatively, each access network device (or core network device) may be in communication connection with a plurality of forwarding devices, and each forwarding device may be in communication connection with a plurality of access network devices (or core network devices). Therefore, when a terminal device #1 shown in FIG. 7 needs to send data to a terminal device #2, the access network device #1 may send the data to the forwarding device #1. When the shown terminal device #1 needs to send data to a terminal device #3 or a terminal device #4, the access network device #1 may send the data to the forwarding device #2. Therefore, the forwarding devices do not need to be in communication connection with each other.

It should be understood that the foregoing enumerated configuration manners shown in FIG. 2 to FIG. 7 are merely examples for description, and this application is not limited thereto. For example, the access network device in FIG. 2 to FIG. 7 may be replaced with a core network device.

In the embodiments of this application, the terminal device or the forwarding device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more types of computer operating systems, for example, a Linux™ operating system, a Unix™ operating system, an Android™ operating system, an iOS™ operating system, or a Windows' operating system, that implement service processing by using a process. The application layer includes applications such as a browser, an address book, word processing software, and instant messaging software. In addition, the embodiments of this application impose no special limitation on a specific structure of an execution body of the method provided in the embodiments of this application, provided that a program that records code of the method provided in the embodiments of this application can be run to perform communication according to the method provided in the embodiments of this application. For example, the method provided in the embodiments of this application may be performed by a terminal device or a network device, or may be performed by a function module that is in a terminal device or a network device and that can invoke and execute a program.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smartcard, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry an instruction and/or data.

It should be noted that in the embodiments of this application, a plurality of application programs may be run at the application layer. In this case, an application program for performing the communication method in the embodiments of this application and an application program configured to control a receive-end device to implement an action corresponding to received data may be different application programs.

Figure 8:
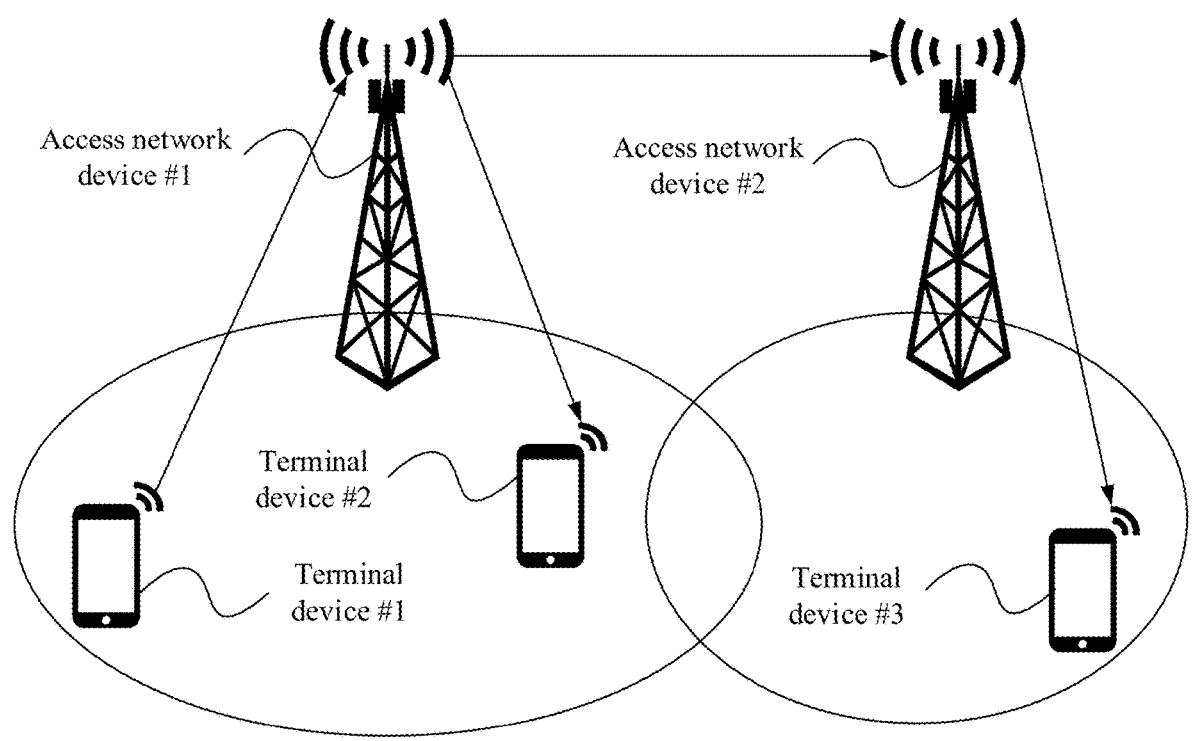
FIG. 8 is a schematic diagram of an example of a structure of a mobile network according to this application.

FIG. 8 is a schematic diagram of an example of a system to which a communication method in an embodiment of this application is applicable when a forwarding device is configured in an access network device. As shown in FIG. 8, a terminal device #1 and a terminal device #2 are located in a cell provided by an access network device #1 (or a forwarding device #1). A terminal device #3 is located in a cell provided by an access network device #2 (or a forwarding device #2). Therefore, when the terminal device #1 needs to send data to the terminal device #2, the access network device #1 may directly send the data to the terminal device #2. When the terminal device #1 needs to send data to the terminal device #3, the access network device #1 may send the data to the access network device #2, and the access network device #2 sends the data to the terminal device #3.

Each access network device may include one or more antennas. In addition, the access network device may further include a transmitter chain and a receiver chain. A person of ordinary skill in the art can understand that the transmitter chain and the receiver chain each may include a plurality of components (for example, a processor, a modulator, a multiplexer, a demodulator, a demultiplexer, or an antenna) related to signal sending and receiving.

Each access network device may communicate with a plurality of terminal devices.

The terminal device may be, for example, a cellular phone, a smartphone, a portable computer, a handheld communications device, a handheld computing device, a satellite radio apparatus, a global positioning system, a PDA, and/or any other suitable device used for communication in a wireless communications system.

The access network device may send data or information to the terminal device over a forward link (also referred to as a downlink), and receive data or information from the terminal device over a reverse link (also referred to as an uplink).

For example, in a frequency division duplex (Frequency Division Duplex, FDD) system, for example, the forward link and the reverse link may use different frequency bands.

For another example, in a time division duplex (TDD) system and a full duplex system, the forward link and the reverse link may use a same frequency band.

Each antenna (or an antenna group including a plurality of antennas) and/or an area designed for communication are/is referred to as secotors/a sector of the access network device.

For example, an antenna group may be designed to communicate with a terminal device in a sector within a coverage area of the access network device. The access network device may send signals to all terminal devices in a corresponding sector by using a single antenna or a multi-antenna transmit diversity.

In a process in which the access network device communicates with the terminal device over the forward link, a transmit antenna of the access network device may improve a signal-to-noise ratio of the forward link through beamforming.

In addition, compared with a manner in which the access network device sends the signals to all the terminal devices of the access network device by using the single antenna or the multi-antenna transmit diversity, when the access network device sends, through beamforming, the signals to terminal devices that are randomly scattered in a related coverage area, interference to a mobile device in a neighboring cell is less.

At a given time, the access network device or the terminal device may be a wireless communications sending apparatus and/or a wireless communications receiving apparatus.

When sending data, the wireless communications sending apparatus may encode data for transmission. Specifically, the wireless communications sending apparatus may obtain (for example, generate, receive from another communications apparatus, or store in a memory) a particular quantity of data bits to be sent, over a channel, to the wireless communications receiving apparatus. The data bits may be included in a transport block (or a plurality of transport blocks) of the data, and the transport block may be segmented to produce a plurality of code blocks.

In addition, the communications system 100 may be a PLMN network, a D2D network, an M2M network, an IoT network, a V2X network, or another network. FIG. 8 is merely a simplified schematic diagram of an example. The network may further include another access network device, or other network elements of the mobile network are not shown in FIG. 8.

The following describes in detail a process of a communication method in an embodiment of this application with reference to FIG. 9 to FIG. 21.

Figure 9:
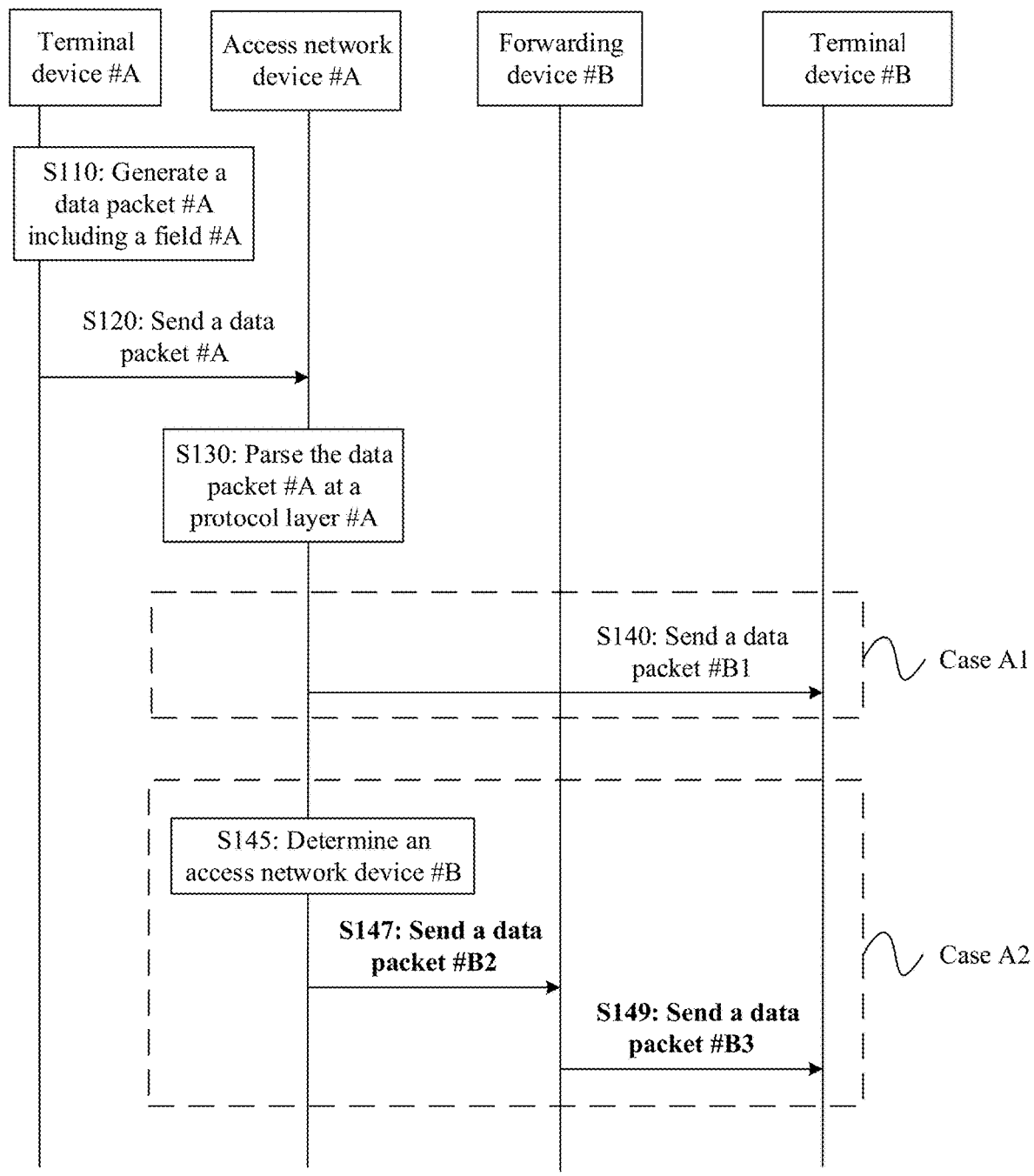
FIG. 9 is a schematic interaction diagram of an example of a communication method according to this application.

FIG. 9 shows a process in which a terminal device #A (that is, an example of a first terminal device) sends data #A (that is, an example of first data) to a terminal device #B (that is, an example of a second terminal device). The terminal device #A is located in a cell provided by an access network device #A. In addition, in the data transmission process shown in FIG. 9, a forwarding device is disposed in the access network device #A. In other words, the access network device #A can implement a function of the forwarding device (for example, a first forwarding device) in this application.

In S110, the terminal device #A may generate a data packet #A, where the data packet #A carries the data #A. In addition, the data packet #A includes a field #A (that is, an example of a target field). The field #A is used to carry information #A (that is, an example of target information).

The following describes the information #A in detail.

In this embodiment of this application, the information #A may be used by the access network device #A to determine a destination to which the data #A needs to be sent.

By way of example, and not limitation, the information #A may include at least one of the following information:

A. Information about the terminal device #B

For example, when data #B is unicast data that needs to be sent to the terminal device #B, the information about the terminal device #B may include a device identifier of the terminal device #B, and the device identifier of the terminal device #B can uniquely determine the terminal device #B. For example, the device identifier of the terminal device #B may include but is not limited to at least one of the following information: an internet protocol (IP) address of the terminal device #B, a media access control (MAC) address of the terminal device #B, an international mobile subscriber identification number (IMSI) of the terminal device #B, an international mobile equipment identification number (IMEI) of the terminal device #B, an electronic serial number (ESN) of the terminal device #B, a mobile phone number of the terminal device #B, a temporary identifier allocated by a mobile network to the terminal device #B, or the like.

For another example, when the data #B is multicast data that needs to be sent to a group (denoted as a group #B) to which the data #B belongs, the information about the terminal device #B may include a group identifier of the group #B. The group identifier of the group #B can uniquely indicate the group #B. For example, as an example instead of a limitation, the group identifier of the group #B may include but is not limited to at least one of the following information: an IP multicast address of the group #B, a MAC multicast address of the group #B, a group identity (ID) of the group #B, or the like.

It should be understood that the foregoing enumerated information about the terminal device #B is merely an example for description, and this application is not limited thereto. Other information that can be used to determine the terminal device #B or the group of the terminal device #B falls within the protection scope of this application.

B. Information about an area #B

In this case, the data #B is data that needs to be broadcast to the area #B (that is, an example of a first area), and the terminal device #B may be a terminal device located in the area #B.

For example, as an example instead of a limitation, the information about the area #B may include mobile network information of the area #B, and the mobile network information may include but is not limited to at least one of the following information: a cell identifier (or a cell list), a tracking area identity (or a tracking area list), an access network notification area identifier (or an access network notification area list), and a broadcast service area identifier (or a broadcast service area list).

For another example, the information about the area #B may include absolute geographical information of the area #B. For example, the area #B may be a circle. In this case, the absolute geographical information may include information about geographical coordinates of a center of a circular geographical area and information about a radius. For another example, the area #B may be a polygonal geographical area formed by connecting a plurality of geographical coordinate lines. In this case, the absolute geographical information may include information about geographical coordinates.

For another example, the information about the area #B may include relative geographical information of the area #B, and the relative geographical information may be information about a relative location of the area #B relative to a specified area #C.

The area #C may be an area agreed on by the terminal device #A and the access network device #A, or the area #C may be an area specified in a communications system or a communication protocol. In other words, locations of the area #C determined by the terminal device #A and the access network device #A are the same.

For example, the area #C may be determined based on a geographical location of a cell in which the terminal device #A is located, or the area #C may be determined based on a geographical location of the terminal device #A, or the area #C may be determined based on a geographical location of the access network device #A.

By way of example, and not limitation, the relative geographic information may include information about a distance between the area #B and an area #A, and/or information about an azimuth position in which the area #B is located in a plurality of azimuth positions of the area #A.

It should be understood that the foregoing enumerated information about the area #B is merely an example for description, and this application is not limited thereto. Other information that can be used to determine the area #B falls within the protection scope of this application.

In addition, it should be understood that the foregoing enumerated information about the area #B and the foregoing enumerated information about the terminal device #B are merely examples for description of the information #A. This application is not limited thereto. Other information that can enable the data #A to be routed to the terminal device #B or the area #B may be used as the information #A.

By way of example, and not limitation, in this embodiment of this application, the field #A may be a field in a protocol data unit (PDU) of a protocol layer #A corresponding to the data packet #A.

In addition, as an example instead of a limitation, the protocol layer #A may include at least one protocol layer, for example, a packet data convergence protocol (PDCP) layer, a radio link control (RLC) layer, and a media access control (MAC) layer, in a second layer (which may also be referred to as layer 2) of a radio interface protocol stack used for wireless communication between a terminal device and an access network device.

It should be understood that the foregoing enumerated protocol layer #A is merely an example for description, and this application is not limited thereto. The protocol layer #A may alternatively be any protocol layer in a radio interface protocol stack.

Optionally, in this embodiment of this application, in addition to the information #A, the data packet #A may further carry at least one of the following information:

Information #B: information about the terminal device #A. An implementation of the information about the terminal device #A may be similar to an implementation of the information about the terminal device #B. To avoid repetition, detailed descriptions thereof are omitted herein.

Information #C: information about the area #A. The information about the area #A may include information about a mobile network in which the terminal device #A is located, or the information about the area #A may include information about a geographical location in which the terminal device #A is located, or the information about the area #A may include information about a geographical location in which the access network device #A is located.

Information #D: quality of service (QoS) information of a service to which the data #A belongs.

Information #E: time information corresponding to the data #A. The time information may be used to indicate at least one of the following times: a generation time of the data #A, an expected sending time of the data #A, a latest sending time of the data #A, a synchronous sending time identifier of the data #A, and the like. The "time" may be expressed in a plurality of manners. For example, the time may be an absolute time, such as a coordinated universal (UTC) time or a global positioning system (GPS) clock. Alternatively, the time may be a relative time, such as a GPS clock count offset, or a relative SFN offset that uses a system frame number (SFN) broadcast by a network as a reference.

Figure 10:
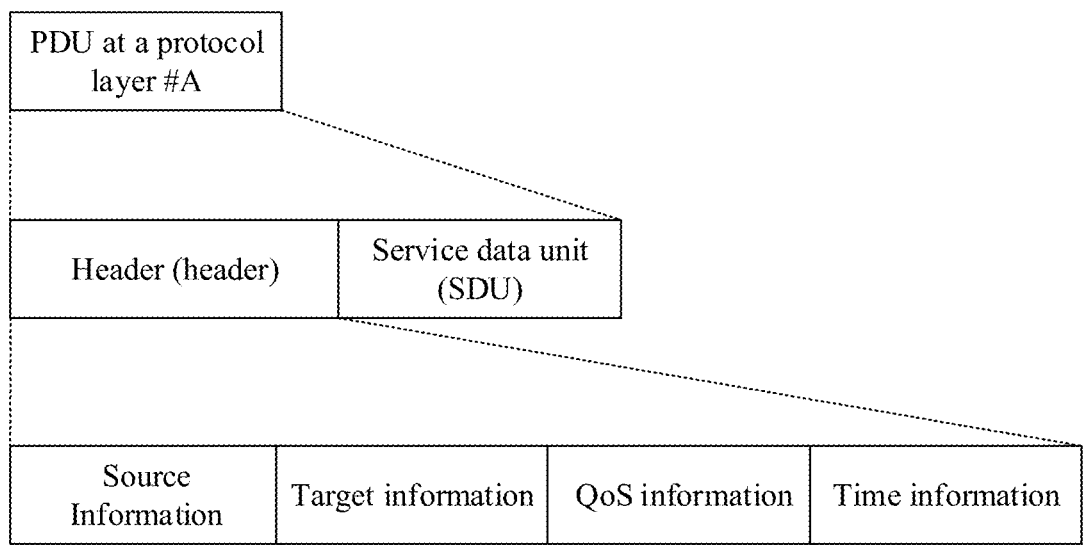
FIG. 10 is a schematic diagram of an example of a PDU having a target field according to this application.

In addition, in this embodiment of this application, the information #A to the information #E may be carried in a same PDU (for example, a PDU of the protocol layer #A). Specifically, the information #A to the information #E may be carried in a header of a same PDU. For example, FIG. 10 is a schematic diagram of an example of the PDU.

It should be understood that the foregoing enumerated carrying manners of the information #A to the information #E are merely examples for description. This application is not limited thereto. For example, some information in the information #A to the information #E may alternatively be carried in PDUs of different protocol layers. In addition, in this embodiment of this application, the data packet #A may not carry some or all of the information #B to the information #E.

In this embodiment of this application, the following cases may exist.

Case A: The field #A carries the information #A.

Case B: The field #A does not carry the information #A. In addition, in this case, the information carried in the field #A may be empty, or the field #A may carry specified information #A'. For example, the information #A' may include a plurality of bits, and a bit of each bit is 0, or a bit of each bit is 1.

In S120, the terminal device #A may send the generated data packet #A shown above to the access network device #A.

In S130, the access network device #A may parse the data packet #A on an entity of the protocol layer #A, to determine whether the target field #A carries the information #A, that is, the foregoing case A or case B.

The following separately describes in detail processing of the access network device #A in the case A and the case B.

Case A

The access network device #A may determine, based on the information #A, a destination to which the data #A needs to be sent.

For example, if the information #A includes the information about the terminal device #B, the access network device #A may determine the terminal device #B or the group #B based on the information #A.

For another example, if the information #A includes the information about the area #B, the access network device #A may determine the area #B based on the information #A.

Case A-1

When the access network device #A can communicate with the terminal device #B or the group #B, or when coverage of the access network device #A includes the area #B, in S140, the access network device #A encapsulates data (that is, the data #A) carried in the data packet #A, to generate a data packet #B1 conforming to a communication protocol between the access network device #A and a terminal device (including the terminal device #B), and sends the data packet #B1 to the terminal device #B, or a terminal device in the group #B or the area #B.

Optionally, if the data packet #A carries one or more of the information #B to the information #E, the access network device #A may further send the data packet #B1 based on one or more of the information #B to the information #E.

For example, the access network device #A may add the information #B to the data packet #B1, so that a receive-end terminal device can determine, based on the information #B, that data in the data packet #B1 comes from the terminal device #A.

For another example, the access network device #A may add the information #C to the data packet #B1, so that the receive-end terminal device can determine, based on the information #B, that the data in the data packet #B1 comes from a terminal device in the area #A.

For another example, the access network device #A may determine, based on the information #D, a transmission resource used to carry the data packet #B1, to meet a QoS requirement of the data #A.

For example, the access network device #A may determine a sending time of the data packet #B1 based on the information #E.

Optionally, if the data packet #A does not carry one or more of the information #B to the information #E, the access network device #A may further obtain one or more of the information #B to the information #E, for example, from another device (for example, a server of an operator of the terminal device #A), and send the data packet #B1 based on one or more of the information #B to the information #E.

Case A-2

When the access network device #A cannot communicate with the terminal device #B or the group #B, or when coverage of the access network device #A does not include the area #B, in S145, the access network device #A may determine a forwarding device #B (that is, an example of a second forwarding device) based on the information #A.

For example, the forwarding device #B may include an access network device #B or a core network device #B.

The access network device #B is an access network device that can communicate with the terminal device #B or the group #B, or coverage of the access network device #B includes the area #B.

The core network device #B is a core network device that can communicate with the access network device #B.

It should be understood that the foregoing enumerated forwarding device #B is merely an example for description, and this application is not limited thereto. For example, the forwarding device #B may include a network element that can communicate with the terminal device #B or a terminal device in the area #B and that is in a mobile network.

By way of example, and not limitation, in this embodiment of this application, the access network device #A may store a mapping relationship #A.

The mapping relationship #A may be used to indicate a forwarding device (for example, an access network device or a core network device) connected to each of a plurality of terminal devices. For example, the mapping relationship #A may be specifically a correspondence between information about M terminal devices and N forwarding devices, each terminal device is connected to a corresponding forwarding device, and M and N are integers greater than or equal to 1.

Alternatively, the mapping relationship #A may be used to indicate an area covered by each forwarding device in a plurality of forwarding devices (for example, an access network device or a core network device). For example, the mapping relationship #A may specifically indicate a correspondence between information about K terminal areas and P forwarding devices, each forwarding device can cover a corresponding area, and K and P are integers greater than or equal to 1.

By way of example, and not limitation, the mapping relationship #A may be delivered by a control device in a mobile network to the access network device #A.

For example, in this embodiment of this application, the control device may be connected to each forwarding device (for example, an access network device or a core network device) in a communications system, and each forwarding device may report, to the control device, information about a terminal device that can communicate with the forwarding device; or each forwarding device may report, to the control device, information about an area covered by the forwarding device. Therefore, the control device may generate the mapping relationship #A based on information reported by each forwarding device.

It should be understood that the foregoing enumerated method for determining the mapping relationship #A by the control device or the access network device #A is merely an example for description. This application is not limited thereto. The control device or the access network device #A may alternatively determine the mapping relationship #A based on an input of an administrator or an operator.

In addition, in S147, the access network device #A encapsulates data (that is, the data #A) carried in the data packet #A, to generate a data packet #B2 that conforms to a communication protocol between the access network device #A and the forwarding device #B (for example, the access network device #B or the core network device #B), and sends the data packet #B2 to the forwarding device #B.

Optionally, the access network device #A may further encapsulate at least one of the information #B to the information #E into the data packet #B2.

In S149, the forwarding device #B may encapsulate data (that is, the data #A) carried in the data packet #B2, to generate a data packet #B3 that conforms to a communication protocol between the forwarding device #B and a terminal device (including the terminal device #B), and send the data packet #B3 to the terminal device #B, or a terminal device in the group #B or the area #B.

Optionally, if the data packet #B2 carries one or more of the information #B to the information #E, the forwarding device #B may further send the data packet #B1 based on one or more of the information #B to the information #E, and the process may be similar to the process described in the foregoing case A-1. To avoid repetition, detailed descriptions thereof are omitted herein.

Optionally, if the data packet ##B2 does not carry one or more of the information #B to the information #E, the forwarding device #B may further obtain one or more of the information #B to the information #E, for example, from another device (for example, a server of an operator), and send the data packet #B2 based on one or more of the information #B to the information #E. The process may be similar to a process in which the access network device #A sends the data packet #B1 based on one or more of the information #B to the information #E. Herein, to avoid repetition, detailed descriptions thereof are omitted herein.

Case B

If the access network device #A determines that the field #A does not carry the information #A, for example, the information carried in the field #A is empty, or the field #A carries specified information #A' (for example, information whose bits are all 0 or 1), the access network device #A may determine the information #A based on the information about the terminal device #A.

By way of example, and not limitation, for example, the information about the terminal device #A may include context information of the terminal device #A, so that the access network device #A may determine the information #A based on the context information of the terminal device #A, in other words, determine that the data packet #A needs to be sent to the terminal device #B or the area #B.

For another example, the information about the terminal device #A may include a device identifier of the terminal device #A, a group identifier of a group to which the terminal device #A belongs, a cell identifier of a cell in which the terminal device #A is located, a bearer identifier of a bearer corresponding to the terminal device #A, or the like.

In this case, the access network device #A may prestore a mapping relationship (denoted as a mapping relationship #B) between information about a plurality of terminal devices and a plurality of forwarding devices, so that the access network device #A determines, as the forwarding device #B, a forwarding device that is indicated in the mapping relationship #B and that corresponds to the information about the terminal device #A.

In addition, as an example instead of a limitation, for example, the access network device #A may negotiate, with the terminal device #A in advance, a forwarding device (that is, the forwarding device #B) corresponding to the information about the terminal device #A. Therefore, a correspondence between the information about the terminal device #A and the forwarding device #B may be recorded in the mapping relationship #B.

For another example, the access network device #A may predetermine, based on the information about the terminal device #A, the terminal device #B that communicates with the terminal device #A, determine the forwarding device #B based on the information about the terminal device #B, and further, record a correspondence between the information about the terminal device #A and the forwarding device #B in the mapping relationship #B.

Similarly, the access network device #A may determine a forwarding device corresponding to information about each terminal device served by the access network device #A, and further determine the mapping relationship #B.

Alternatively, the mapping relationship #B may be entered by an administrator into the access network device #A.

Alternatively, the mapping relationship #B may be obtained by the access network device #A from a manufacturer or an operator.

Therefore, in the case B, the access network device #A can determine that the data packet #A needs to be sent to the terminal device #B or the area #B, and can determine the forwarding device #B.

A subsequent process may be similar to a sending process described in the case A. To avoid repetition, detailed descriptions thereof are omitted herein.

Figure 11:
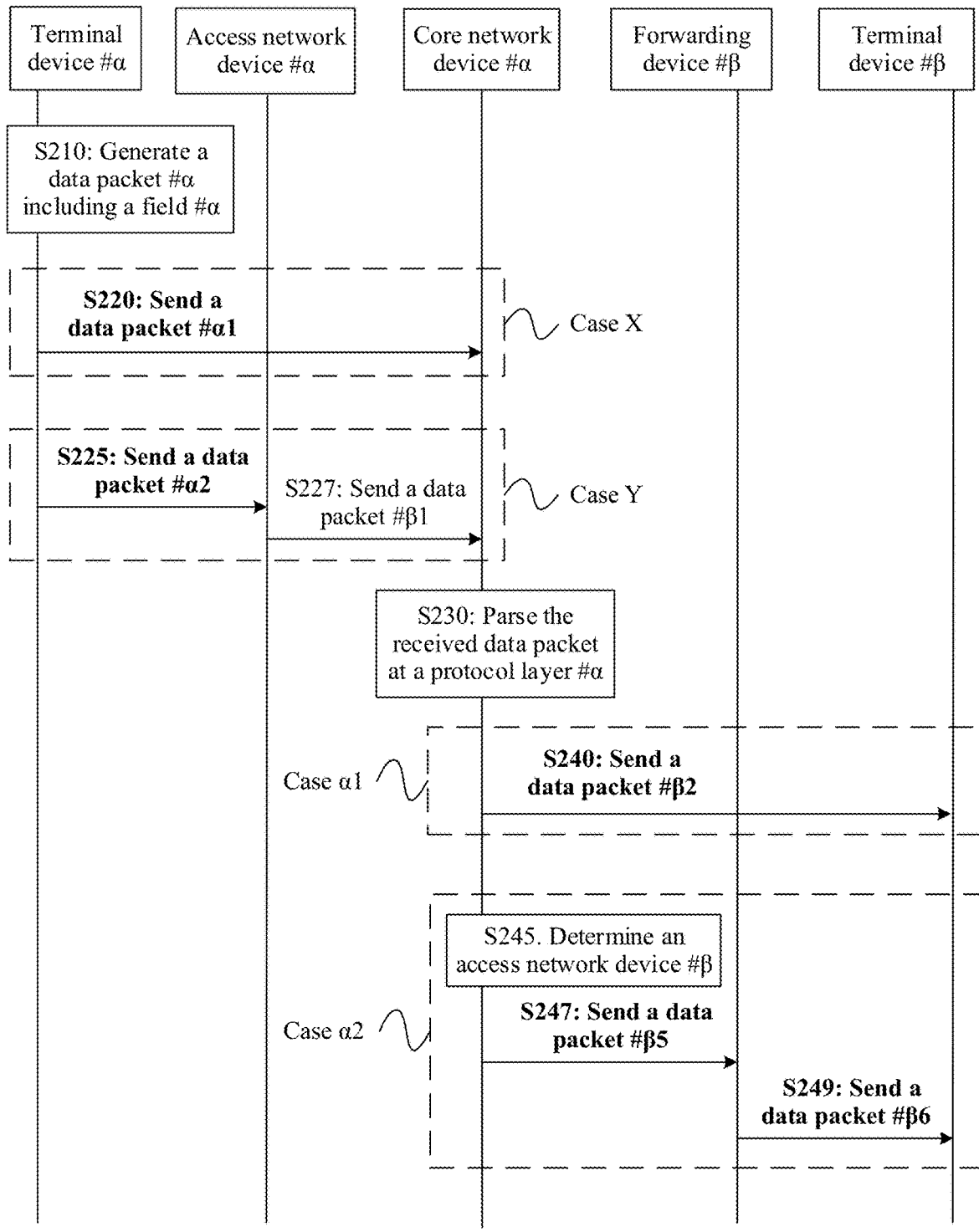
FIG. 11 is a schematic interaction diagram of another example of a communication method according to this application.

FIG. 11 shows a process in which a terminal device #α (that is, another example of a first terminal device) sends data #α (that is, another example of first data) to a terminal device #β (that is, another example of a second terminal device). The terminal device #α is located in a cell provided by an access network device #α. In addition, in the data transmission process shown in FIG. 11, a forwarding device is disposed in a core network device #α communicating with the access network device #α. In other words, the core network device #α can implement a function of the forwarding device (for example, a first forwarding device) in this application.

In S210, the terminal device #α may generate a data packet #α, where the data packet #α carries data #α. In addition, the data packet #α includes a field #α (that is, another example of a target field). The field #α is used to carry information #α (that is, an example of target information).

The following describes the information #α in detail.

In this embodiment of this application, the information #α may be used by the core network device #α to determine a destination to which the data #α needs to be sent.

By way of example, and not limitation, the information #α may include at least one of the following information:

α. Information about the terminal device #β

For example, when data #β is unicast data that needs to be sent to the terminal device #β, the information about the terminal device #β may include a device identifier of the terminal device #β, and the device identifier of the terminal device #β can uniquely determine the terminal device #β. For example, the device identifier of the terminal device #β may include but is not limited to at least one of the following information: an internet protocol (IP) address of the terminal device #β, a MAC address of the terminal device #β, an IMSI of the terminal device #β, an IMEI of the terminal device #β, an ESN of the terminal device #β, a mobile phone number of the terminal device #β, a temporary identifier allocated by a mobile network to the terminal device #β, or the like.

For another example, when the data #β is multicast data that needs to be sent to a group (denoted as a group #β) to which the data #β belongs, the information about the terminal device #β may include a group identifier of the group #β. The group identifier of the group #β can uniquely indicate the group #β. For example, as an example instead of a limitation, the group identifier of the group #β may include but is not limited to at least one of the following information: an IP multicast address of the group #β, a MAC multicast address of the group #β, a group identity ID of the group #β, or the like.

It should be understood that the foregoing enumerated information about the terminal device #β is merely an example for description, and this application is not limited thereto. Other information that can be used to determine the terminal device #β or the group of the terminal device #β falls within the protection scope of this application.

β. Information about an area #β

In this case, the data #β is data that needs to be broadcast to the area #β (that is, another example of a first area), and the terminal device #β may be a terminal device located in the area #β.

For example, as an example instead of a limitation, the information about the area #β may include mobile network information of the area #β, and the mobile network information may include but is not limited to at least one of the following information: a cell identifier (or a cell list), a tracking area identity (or a tracking area list), an access network notification area identifier (or an access network notification area list), and a broadcast service area identifier (or a broadcast service area list).

For another example, the information about the area #β may include absolute geographical information of the area #β. For example, the area #β may be a circle. In this case, the absolute geographical information may include information about geographical coordinates of a center of a circular geographical area and information about a radius. For another example, the area #β may be a polygonal geographical area formed by connecting a plurality of geographical coordinates. In this case, the absolute geographical information may include information about the geographical coordinates.

For another example, the information about the area #β may include relative geographical information of the area #β, and the relative geographical information may be information about a relative location of the area #β relative to a specified area #γ.

The area #γ may be an area agreed on by the terminal device #α and the core network device #α, or the area #γ may be an area specified in a communications system or a communication protocol. In other words, locations of the area #γ determined by the terminal device #α and the core network device #α are the same.

For example, the area #γ may be determined based on a geographical location of a cell in which the terminal device #α is located, or the area #γ may be determined based on a geographical location of the terminal device #α, or the area #γ may be determined based on a geographical location of the access network device #α.

By way of example, and not limitation, the relative geographic information may include information about a distance between the area #β and an area #α, and/or information about a position in which the area #β is located in a plurality of positions of the area #α.

It should be understood that the foregoing enumerated information about the area #β is merely an example for description, and this application is not limited thereto. Other information that can be used to determine the area #β falls within the protection scope of this application.

In addition, it should be understood that the foregoing enumerated information about the area #β and the foregoing enumerated information about the terminal device #β are merely examples for description of the information #α. This application is not limited thereto. Other information that can enable the data #α to be routed to the terminal device #β or the area #β may be used as the information #α.

By way of example, and not limitation, in this embodiment of this application, the field #α may be a field in a PDU of a protocol layer #α corresponding to a data packet #α.

In addition, as an example instead of a limitation, the protocol layer #α may include at least one protocol layer, for example, a PDCP layer, an RLC layer, and a MAC layer, in layer 2 of a radio interface protocol stack used for wireless communication between a terminal device and an access network device.

It should be understood that the foregoing enumerated protocol layer #α is merely an example for description, and this application is not limited thereto. The protocol layer #α may alternatively be any protocol layer in a radio interface protocol stack.

Optionally, in this embodiment of this application, in addition to the information #α, the data packet #α may further carry at least one of the following information:

Information #β: information about the terminal device #α. An implementation of the information about the terminal device #α may be similar to an implementation of the information about the terminal device #β. To avoid repetition, detailed descriptions thereof are omitted herein.

Information #γ: information about an area #α. The information about the area #α may include information about a mobile network in which the terminal device #α is located, or the information about the area #α may include information about a geographical location in which the terminal device #α is located, or the information about the area #α may include information about a geographical location in which the access network device #α is located.

Information #ε: QoS information of a service to which the data #α belongs.

Information #Θ: time information corresponding to the data #α. The time information may be used to indicate at least one of the following times: a generation time of the data #α, an expected sending time of the data #α, a latest sending time of the data #α, a synchronous sending time identifier of the data #α, and the like. The "time" may be expressed in a plurality of manners. For example, the time may be an absolute time, such as a UTD time or a GPS clock. Alternatively, the time may be a relative time, such as a GPS clock count offset, or a relative SFN offset that uses an SFN broadcast by a network as a reference.

In addition, in this embodiment of this application, the information #α to the information #Θ may be carried in a same PDU (for example, a PDU of the protocol layer #α). Specifically, the information #α to the information #Θ may be carried in a header of a same PDU.

It should be understood that the foregoing enumerated carrying manners of the information #α to the information #Θ are merely examples for description. This application is not limited thereto. For example, some information in the information #α to the information #Θ may alternatively be carried in PDUs of different protocol layers. In addition, in this embodiment of this application, the data packet #α may not carry some or all of the information #β to the information #Θ.

In this embodiment of this application, the following cases may exist.

Case α: The field #α carries the information #α.

Case μ: The field #α does not carry the information #α. In addition, in this case, the information carried in the field #α may be empty, or the field #α may carry specified information #α'. For example, the information #α' may include a plurality of bits, and a bit of each bit is 0, or a bit of each bit is 1.

Case X: When the terminal device #α can directly communicate with the core network device #α, in S220, the terminal device #α may send a data packet #α1 to the core network device #α. The data packet #α1 may be in a form that is of the data packet #α and that conforms to a communication protocol between the terminal device and the core network device.

Case Y: When the terminal device #α cannot directly communicate with the core network device #α, in S225, the terminal device #α may send a data packet #α2 to the core network device #α that serves the terminal device #α. The data packet #α2 may be in a form that is of the data packet #α and that conforms to a communication protocol between the terminal device and the access network device.

In S227, the access network device #α may encapsulate data in the data packet #α2, to generate a data packet β1 that conforms to a transmission protocol between the access network device and the core network device, and forwards the data packet β1 to the core network device #α.

Optionally, if the data packet #α carries one or more of the information #β to the information #Θ, the access network device #α may further send the data packet #01 based on one or more of the information #β to the information #Θ.

For example, the access network device #α may add the information #β to the data packet #β1, so that a receive-end terminal device can determine, based on the information #β, that data in the data packet #β1 comes from the terminal device #α.

For example, the access network device #α may add the information #γ to the data packet #β1, so that a receive-end terminal device can determine, based on the information #β, that data in the data packet #β1 comes from a terminal device in the area #α.

For another example, the access network device #α may determine, based on the information #ε, a transmission resource used to carry the data packet #β1, to meet a QoS requirement of the data #α.

For example, the access network device #α may determine a sending time of the data packet #β1 based on the information #Θ.

Optionally, if the data packet #α does not carry one or more of the information #β to the information #Θ, the access network device #α may further obtain one or more of the information #β to the information #Θ, for example, from another device (for example, a server of an operator of the terminal device #α), and send the data packet #β1 based on one or more of the information #β to the information #Θ.

In addition, optionally, the access network device #α may further encapsulate one or more of the information #β to the information #Θ into the data packet #β1.

In this embodiment of this application, the access network device #α may be connected to only one core network device (for example, the core network device #α). In this case, the access network device #α may directly send the data packet #β1 to the core network device #α.

Figure 12:
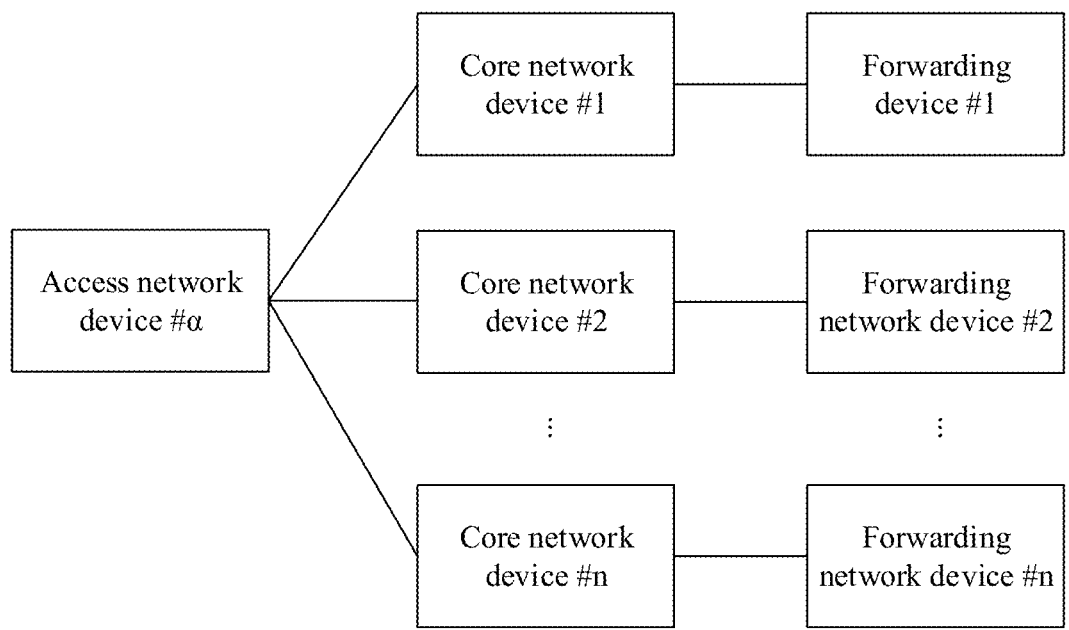
FIG. 12 is a schematic diagram of an example of a configuration manner of an access network device and a core network device according to this application.

Alternatively, as shown in FIG. 12, in this embodiment of this application, the access network device #α may be in communication connection with a plurality of core network devices (including the core network device #α), and the plurality of core network devices may have a correspondence with a plurality of forwarding devices, in other words, each core network device may be in communication connection with a corresponding forwarding device.

In this case, the access network device #α may determine, as the core network device #α, a core network device that is in the plurality of core network devices and that is in communication connection with the forwarding device #β.

A process in which the access network device #α determines the forwarding device #β may be similar to the foregoing process in which the access network device #A determines the forwarding device #B. To avoid repetition, detailed descriptions thereof are omitted herein.

By way of example, and not limitation, the access network device #α may store a mapping relationship #1. The mapping relationship #1 may be used to indicate a correspondence between a plurality of core network devices and a plurality of forwarding devices. Each core network device may communicate with a corresponding forwarding device. Therefore, the access network device #α may determine the core network device #α based on the mapping relationship #1.

By way of example, and not limitation, the mapping relationship #1 may be delivered by a control device in a mobile network to the access network device #α.

For example, in this embodiment of this application, the control device may be connected to each forwarding device (for example, an access network device or a core network device) in a communications system, and each forwarding device may report, to the control device, information about a terminal device that can communicate with the forwarding device; or each forwarding device may report, to the control device, information about an area covered by the forwarding device. In addition, each forwarding device may report, to the control device, information about a core network device that can communicate with the forwarding device. Therefore, the control device may generate the mapping relationship #1 based on information reported by each forwarding device.

It should be understood that the foregoing enumerated method for determining the mapping relationship #1 by the control device or the access network device #α is merely an example for description. This application is not limited thereto. The control device or the access network device #α may alternatively determine the mapping relationship #1 based on an input of an administrator or an operator.

In the foregoing process, to enable the access network device #α to send the data packet #α to the core network device #α, the access network device #α needs to determine the forwarding device β. The process may be similar to the process in which the access network device #A determines the forwarding device #B. To avoid repetition, the detailed descriptions thereof are omitted herein.

In S230, the core network device #α may parse the data packet #β1 at the protocol layer #α, to determine whether the target field #α carries the information #α, that is, the foregoing case α or case β.

The following separately describes in detail processing of the access network device #α in the case a and the case.

Case α

The core network device #α may determine, based on the information #α, a destination to which the data #α needs to be sent.

For example, if the information #α includes the information about the terminal device #β, the core network device #α may determine the terminal device #β or the group #β based on the information #α.

For another example, if the information #α includes the information about the area #β, the core network device #α may determine the area #β based on the information #α.

Case α-1

When the core network device #α can communicate with the terminal device #β or the group #β, or when coverage of the core network device #α includes the area #β, in S240, the core network device #α may encapsulate data (that is, the data #α) carried in the data packet #β1, to generate a data packet #β2 conforming to a communication protocol between the core network device #α and a terminal device (including the terminal device #β), and send the data packet #β2 to the terminal device #β, or a terminal device in the group #β or the area #β.

Alternatively, when an access network device (denoted as an access network device γ) connected to the core network device #α can communicate with the terminal device #β or an access network device in the group #β, or when coverage of an access network device (for example, the access network device γ) connected to the core network device #α includes an area #β, the core network device #α may encapsulate data (that is, the data #α) carried in the data packet #β1, to generate a data packet #β3 that conforms to a communication protocol between the core network device #α and the access network device #, and send the data packet #β3 to the access network device #γ. Therefore, the access network device #γ may encapsulate data (that is, the data #α) carried in the data packet #β3, to generate a data packet #β4 that conforms to a communication protocol between the access network device #γ and a terminal device (including the terminal device #β), and send the data packet #β4 to the terminal device #β or a terminal device in the group #β or the area #β.

Optionally, the core network device #α or the access network device #γ may further send the data packet based on one or more of the information #β to the information #Θ. The process may be similar to the foregoing process in which the core network device #A sends a data packet based on one or more of the information #B to the information #E. To avoid repetition, detailed descriptions thereof are omitted herein.

Optionally, the core network device #α may further add one or more of the information #β to the information #Θ to the data packet #β3.

Case α-2

When the core network device #α cannot communicate with the terminal device #β or the group #β, or when coverage of the core network device #α does not include the area #β, in S245, the core network device #α may determine a forwarding device #β (that is, an example of a second forwarding device) based on the information #α.

For example, the forwarding device #β may include an access network device #β or a core network device #β.

The access network device #β is an access network device that can communicate with the terminal device #β or the group #β, or coverage of the access network device #β includes the area #β.

The core network device #β is a core network device that can communicate with the access network device #β.

It should be understood that the foregoing enumerated forwarding device #β is merely an example for description, and this application is not limited thereto. For example, the forwarding device #β may include a network element that can communicate with the terminal device #β or a terminal device in the area #β and that is in a mobile network.

By way of example, and not limitation, in this embodiment of this application, the core network device #α may store a mapping relationship #2.

The mapping relationship #2 may be used to indicate a forwarding device (for example, an access network device or a core network device) connected to each of a plurality of terminal devices. For example, the mapping relationship #2 may specifically indicate a correspondence between information about M terminal devices and N forwarding devices, each terminal device is connected to a corresponding forwarding device, and M and N are integers greater than or equal to 1.

Alternatively, the mapping relationship #2 may be used to indicate an area covered by each forwarding device in a plurality of forwarding devices (for example, an access network device or a core network device). For example, the mapping relationship #2 may specifically indicate a correspondence between information about K terminal areas and P forwarding devices, each forwarding device can cover a corresponding area, and K and P are integers greater than or equal to 1.

By way of example, and not limitation, the mapping relationship #2 may be delivered by a control device in a mobile network to the core network device #α.

For example, in this embodiment of this application, the control device may be connected to each forwarding device (for example, an access network device or a core network device) in a communications system, and each forwarding device may report, to the control device, information about a terminal device that can communicate with the forwarding device; or each forwarding device may report, to the control device, information about an area covered by the forwarding device. Therefore, the control device may generate the mapping relationship #2 based on information reported by each forwarding device.

It should be understood that the foregoing enumerated method for determining the mapping relationship #2 by the control device or the core network device #α is merely an example for description. This application is not limited thereto. The control device or the core network device #α may alternatively determine the mapping relationship #2 based on an input of an administrator or an operator.

In S247, the core network device #α encapsulates data (that is, the data #α) carried in the data packet #β1, to generate a data packet #β5 that conforms to a communication protocol between the core network device #α and the forwarding device #β (for example, the access network device #β or the core network device #β), and sends the data packet #β5 to the forwarding device #β.

In S249, the forwarding device #β encapsulates data (that is, the data #α) carried in the data packet #β5, to generate a data packet #β6 that conforms to a communication protocol between the forwarding device #β and a terminal device (including the terminal device #β), and sends the data packet #β6 to the terminal device #β, or a terminal device in the group #β or the area #β.

Optionally, if the data packet #β1 carries one or more of the information #β to the information #ε, the core network device #α may further send the data packet #β5 based on one or more of the information #β to the information #Θ, and the process may be similar to the process described in the foregoing case A-1.

Optionally, if the data packet #01 does not carry one or more of the information #β to the information #Θ, the core network device #α may further obtain one or more of the information #β to the information #Θ, for example, from another device (for example, a server of an operator of the terminal device #α), and add one or more of the information #β to the information #ε to the data packet #β5.

Therefore, the forwarding device #β may send the data packet β6 based on one or more of the information #β to the information #Θ, and the process may be similar to a process in which the access network device #A sends the data packet based on one or more of the information #B to the information #E. To avoid repetition, detailed descriptions thereof are omitted herein.

A specific transmission process of the communication method in this application when the forwarding device is an access network device or a core network device is enumerated above. A specific transmission process of the communication method in this application when the forwarding device is a modular logical component is described below.

Without loss of generality, a forwarding device at a transmit end is denoted as an uplink bridge (denoted as a U-bride), and a forwarding device at a receive end is denoted as a downlink bridge (denoted as a D-Bbride).

In this embodiment of this application, a bridging and forwarding relationship between network elements may be described in three phases. A first phase is from a source bridge terminal (denoted as U-UE) to a source bridge node (that is, the U-bridge), a second phase is from the source bridge node to a target bridge node (that is, the D-bridge), and a third phase is from the target bridge node to a target bridge terminal (denoted as D-UE).

The following separately describes in detail specific transmission processes of the three phases.

First Phase

Optionally, when the U-bridge can identify a PDU sent by the U-UE, an access network device (denoted as a U-BS) of the U-UE may transparently forward, to the U-bridge, an uplink bridge application protocol (U-Bridge application protocol, UBAP) PDU sent by the U-UE, and the UBAP PDU may carry information (that is, an example of the target information) used to determine the D-bridge.

Optionally, the U-BS may generate a UBAP' PDU based on the UBAP PDU sent by the U-UE, where the UBAP' PDU is a PDU that conforms to a transmission protocol between the U-BS and the U-bridge; and send the UBAP' PDU to the U-bridge. In addition, optionally, in this case, the U-BS may modify information carried in the UBAP PDU, for example, add QoS information or send time information.

A structure of the UBAP PDU or the UBAP' PDU may be similar to the structure shown in FIG. 10, to be specific, the UBAP PDU or the UBAP' PDU may include a header and an SDU. The SDU is data transmitted between terminals through local bridging. The header may carry at least one of the following information: source information, target information, quality of service requirement information, and time information.

The source information may be address information of a source terminal, for example, an IP address, an L2 MAC address, or terminal identifier information, such as an IMSI or another ID that can be used to determine a terminal, such as a temporary identifier that may be allocated to the terminal by a network to protect privacy or location information of the source terminal, such as an identifier of a cell in which the source terminal is located or geographical location coordinate information.

The target information is used to determine a destination to which the UBAP SDU needs to be sent, and includes an address or identification information of a target terminal, and an address or identification information of a target group, such as an IP multicast address, a MAC multicast address, or a group ID allocated by a network, or may include location information of a mobile network, such as a cell identifier (list), a tracking area identifier (list), an access network notification area (list), a broadcast service area, or another mobile network area identifier formed by cells. Alternatively, the target information may be geographical location information or may be geographical area information, for example, a circular geographical area determined by using geographical coordinates and a radius, or a polygonal geographical area formed by connecting a plurality of geographical coordinates.

The quality of service requirement information is used to determine a service level of the UBAP SDU, and may be represented by using a priority. The priority may also be distinguished according to different bottom layer bearer identifiers of L1/L2. For example, the priority may be distinguished by using different logical channel IDs on an air interface, or may be distinguished by using different tunnel identifiers on an air interface.

The quality of service requirement information is used to indicate time information related to the SDU, for example, a data packet generation time, an expected data packet sending time, a latest data packet sending time, and a synchronous sending time identifier. When the PDU may carry a plurality of types of time information, the time information further needs to carry additional type (type) information to indicate a type of the time information. The PDU may also carry more than one piece of time information. A time may be expressed in a plurality of manners. For example, the time may be an absolute time, such as a UTC time or a GPS clock. Alternatively, the time may be a relative time, such as a GPS clock count offset, or a relative SFN offset that uses an SFN broadcast by a network as a reference.

In this embodiment of this application, a protocol layer may be added to a communication protocol stack to carry the UBAP PDU or the UBAP' PDU. Alternatively, a protocol header of a bottom layer L2 (for example, a PDCP or a GTP-U) may be extended to carry the target information. In this case, a UBAP header is not transmitted, and only the UBAP SDU is transmitted.

Optionally, a header of the UBAP PDU sent by the U-UE may carry no information, or carry only the target information, so that the U-BS may add additional information to the header of the UBAP PDU sent by the U-UE, thereby reducing sending overheads of the U-UE on an air interface.

For example, the source information is generally information known to the U-BS. In addition, the quality of service requirement information may be obtained from bearer ID information carried by U-Uu L1/L2. For example, different QoS is distinguished by using different logical channel IDs or radio bearer IDs. To reduce air interface overheads, the U-UE may send only a short format of the time information. For example, when "32 bits" indicates the time information, the U-UE sends only 16 least significant bits or 8 least significant bits on the U-Uu interface, and the complete 32 bits may be supplemented by the U-BS. In addition, the U-BS may also carry some measurement information such as local load information and channel measurement information of the U-UE, which are carried in the UBAP' SDU and provided for the U-bridge.

When the U-BS and the U-bridge are deployed separately, an n-to-1 relationship may exist. One U-bridge may serve a plurality of U-BSs. The U-BS and the U-bridge may set up a public interface connection for the UBAP SDU, or set up different interfaces for each UE, and the different interfaces are distinguished by using L1/L2 identifiers of the different interfaces. In this case, the UBAP may not carry meta information.

When the U-BS and the U-bridge are co-deployed, that is, a base station supports a U-bridge function, a U-bridge module in the base station can directly process the UBAP PDU sent by the UE without forwarding through an interface.

Second Phase

The U-bridge converts the received UBAP PDU into a BAP PDU and sends the BAP PDU to one or more D-bridges. When the U-bridge and the D-bridge are not co-deployed, one U-bridge may be connected to a plurality of D-bridges, and in turn, one D-bridge may be connected to a plurality of U-bridges. The U-bridge determines, based on header information carried by the UBAP, a D-bridge to which the BAP PDU needs to send.

When the U-bridge and D-bridge are co-deployed, the BAP PDU may be sent to the co-deployed D-bridge by default. The UBAP PDU and the BAP have similar data structures. The U-bridge may directly send the UBAP as a BAP without any modification to the UBAP. The U-bridge may also generate a new BAP after modification and send the new BAP. For example, the target information is modified to information corresponding to a specified D-bridge.

Figure 13:
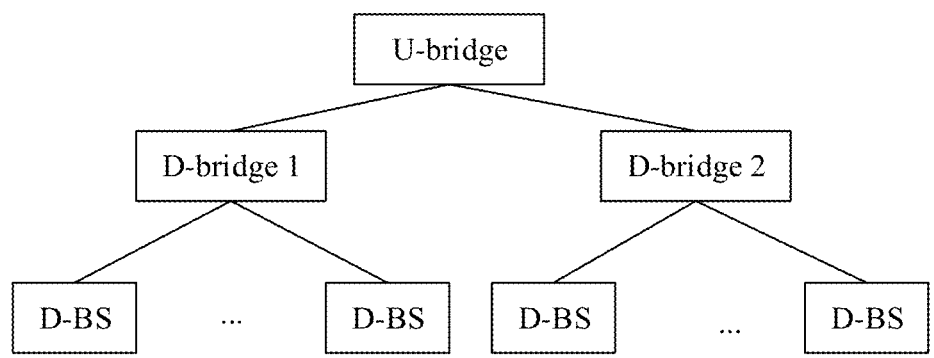
FIG. 13 is a schematic diagram of still another example of a configuration manner of a forwarding device according to this application.

FIG. 13 shows a typical D-bridge configuration. One D-bridge is responsible for a plurality of D-BSs, covering an area. The U-bridge determines, based on information in Dst Info, to which one or more D-bridges a UBAP data packet is sent. When the UBAP data packet needs to be sent to a plurality of D-bridges, the U-bridge may send the UBAP data packet in a multicast manner, or send a plurality of copies of the UBAP PDU to the D-bridges.

Target information may be expressed in any one of the following manners.

(1) When the target information includes a target terminal identifier, the U-bridge needs to send a data packet to a corresponding D-bridge based on information about a correspondence between the target terminal identifier and the D-bridge.

(2) When the target information is information about a target group identifier, similarly, the U-bridge needs to send a data packet to a corresponding D-bridge based on information about a correspondence between the target terminal group identifier and the D-bridge.

(3) When the target information is mobile network location information, the target information is further classified into absolute mobile network location information and a relative mobile network location. The absolute mobile network location information indicates a target cell ID, a location area ID, an access network notification area, a broadcast service area, and the like. The location information may include one or more target location identifiers or a target location identifier list. The relative location information may be an area of relative source information. For example, the source information may be a cell, a location area, an access network notification area, a broadcast service area, or the like in which U-UE is located, and a relative location may be a bridge sending area related to an area shown in the source information. In a special case, the bridge sending area is the area shown in the source information. For example, when the source information indicates a location area, the bridge sending area is the location area. For another example, when the source information is an ID of a cell in which the U-UE is located, a corresponding bridge sending area may be a neighboring cell of the cell. The U-bridge determines the corresponding D-bridge based on a correspondence between the source information and the bridge sending area.

(4) When the target information is geographical location information, the target information is also classified into an absolute location and a relative location. An absolute geographical location area has a plurality of identification manners, such as geographical location coordinates, an area formed by a plurality of geographical location coordinate lines, or a geographical area formed by a circle center and a physical radius that are determined by geographical location coordinates. For a relative location and a relative area using a geographical location as a reference point, a location indicated by the source information may be used as a reference point, for example, an area within a specified distance (for example, 200 meters) by using a geographical location of the U-UE as a center. The U-bridge determines, based on a correspondence between the geographical location and the D-bridge, the D-bridge to which a data packet is sent.

(5) When the target information is not configured, or the target information is specified information (for example, information whose bits are all 0 or 1), the U-bridge may determine, based on a default configuration of a network, such as the relative location, such as a specified range (for example, 200 meters) of a location of the U-UE or a neighboring cell of a cell in which the U-UE is located, the corresponding D-bridge. Alternatively, the corresponding D-bridge may be determined based on a context of the U-UE, for example, by using an identifier of a group to which the U-UE belongs as target group identifier information.

The correspondence of the D-bridge may be represented by D-bridge identifier information, an interface connection number, a D-bridge address, a multicast address corresponding to the D-bridge, or the like.

The D-bridge may be determined by an IP address, a port, or a tunnel identifier. The U-bridge and the D-bridge may distinguish different QoS services by using different tunnel identifiers.

A tunnel may also be referred to as a bearer.

Third Phase

The D-bridge converts the received BAP PDU into a DBAP PDU and sends the DBAP PDU to one or more D-BSs, and then the D-BS sends the DBAP PDU to one or more D-UEs.

The DBAP PDU may be sent in a unicast or multicast manner between the D-bridge and the D-BS.

When the DBAP PDU is sent to at least one D-BS in the unicast manner, the D-bridge needs to copy the DBAP PDU and send copies of the DBAP PDU to the corresponding D-BS one by one, and may determine a target D-BS based on an IP address or a bearer identifier.

When the DBAP PDU is sent in the multicast manner, the target D-BS may be determined by using a multicast MAC address, an IP address, or a tunnel identifier.

The DBAP PDU may be sent in a unicast or multicast manner on an air interface between the D-BS and the D-UE. When the DBAP PDU is sent to at least one D-UE in the unicast manner, the D-BS needs to copy the DBAP and send copies of the DBAP to the D-UE through a dedicated radio bearer of the D-UE on an air interface and by using a dedicated air interface identifier (for example, a C-RNTI). If the D-BS sends the DBAP PDU in the multicast manner, the D-BS may send the DBAP PDU to a group of D-UEs through a corresponding multicast bearer and by using an air interface multicast identifier (for example, a G-RNTI).

The DBAP PDU and the BAP have similar data structures. The D-bridge may directly send the BAP as a DBAP without any modification to the BAP. Similarly, the D-bridge may determine a corresponding D-BS based on Dst Info in the BAP, and send the DBAP PDU to the corresponding D-BS in a multicast manner or a unicast manner through an interface.

The D-BS receives the DBAP, and selects a unicast or multicast manner based on Dst info carried in the DBAP to send the DBAP to D-UE managed by the D-BS. The D-BS may further determine, based on the target information, whether the target information complies with an attribute of the node. For example, if the target information is the target terminal identifier or the target group identifier, the D-BS determines, based on terminal list information or terminal group list information managed by the D-BS, whether Dst info matches the target information. If yes, the D-BS may determine, based on identification information indicated in the target information, an identifier sent through an air interface. For example, when the DBAP PDU is sent to a target terminal, the DBAP PDU is sent to the terminal through a channel indicated by an air interface identifier (such as a C-RNTI) specified by the terminal. If the DBAP PDU is sent to a plurality of target terminals or a group of target terminals at the same time, the D-BS may replicate the DBAP, and send copies of the DBAP to terminals respectively through channels indicated by air interface identifiers of the terminals, or send the DBAP once through a multicast channel or a broadcast channel indicated by an air interface group identifier or a broadcast identifier, and terminals in a target terminal group simultaneously receive the information on a same air interface resource, thereby reducing air interface resources. In addition, based on indication information such as the latest sending time carried in the quality of service requirement information or the time information carried in the DBAP, the D-BS may use a corresponding scheduling priority to ensure that the DBAP PDU is sent according to a requirement of the D-BS. If the time information carries the synchronous sending time, a plurality of D-BSs send the DBAP PDU at the same time, thereby increasing received signal strength of the D-UE within overlapping coverage of the plurality of D-BSs.

Figure 14:
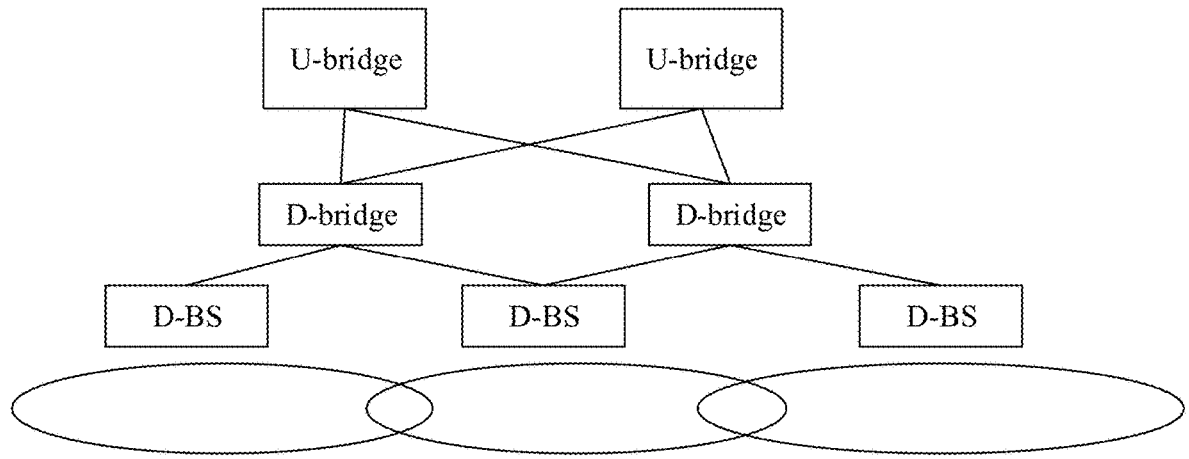
FIG. 14 is a schematic diagram of still another example of a configuration manner of a forwarding device according to this application.

As shown in FIG. 14, different D-bridges may be responsible for bridge forwarding in different areas. Two D-bridges manage D-BSs in two different areas. The areas may overlap (a public D-BS exists).

Figure 15:
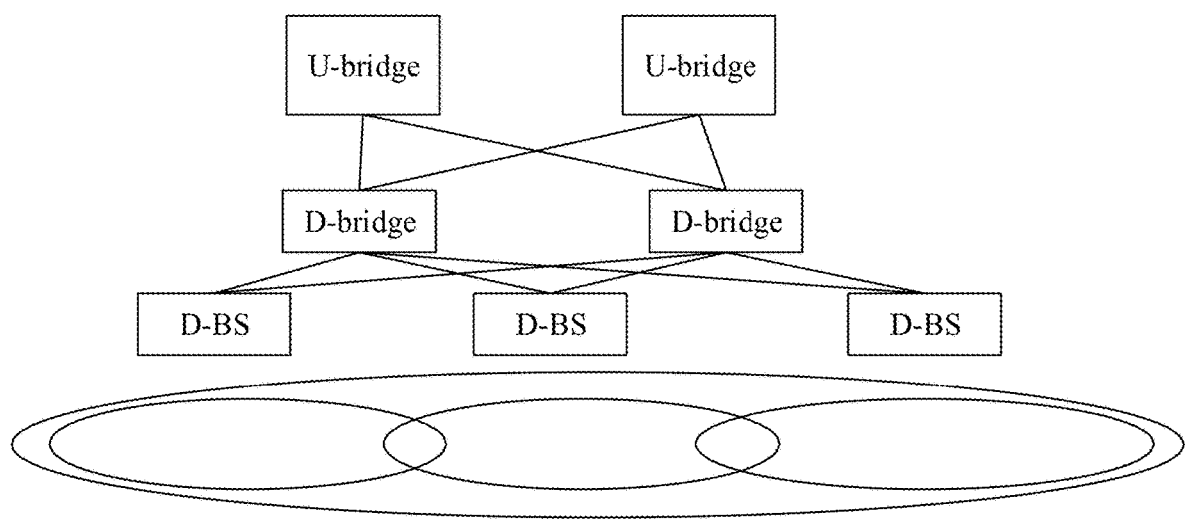
FIG. 15 is a schematic diagram of still another example of a configuration manner of a forwarding device according to this application.

Alternatively, as shown in FIG. 15, different D-bridges manage space division of different granularities, and one D-bridge manages space area division of a small granularity (for example, a cell level). The other D-bridge may manage a bridge service (including continuous coverage of a plurality of cells) in an entire area. When setting up an interface, the U-bridge and D-bridge may learn of areas for which different D-bridges are responsible and select proper D-bridge bridge data based on a service requirement of bridge data of UE.

The U-bridge may obtain bridge area information of the D-bridge based on a management platform. A DNS domain name is constructed based on a D-bridge area. For example, if the U-bridge wants to bridge corresponding data in cell 1, the DNS domain name may be constructed to cell1.bridge.network1, indicating that the U-bridge wants to connect to a D-bridge that bridges cell 1 on network 1, and mapping from a DNS to a corresponding D-bridge IP address.

The following describes two typical low-latency and high-reliability communication scenarios.

Scenario 1: UE needs to send a message to a terminal within 200 meters around the UE. For example, S-UE is an automobile and needs to be parked temporarily in case of an emergency. Alternatively, the S-UE is an automated robot in a factory, and an accident occurs.

Scenario 2: UE belongs to a communication group and needs to send a message to a member. A typical example is formation driving of motor automobiles on a highway, forming a group. Intra-group measurement requires control information such as a braking acceleration before and after quick interaction or data information detected by front and rear measurement sensors. Alternatively, in an industrial Internet scenario, a group of robots collaborate to complete a goods processing operation, and needs to exchange various positioning control information within the group.

Figure 16:
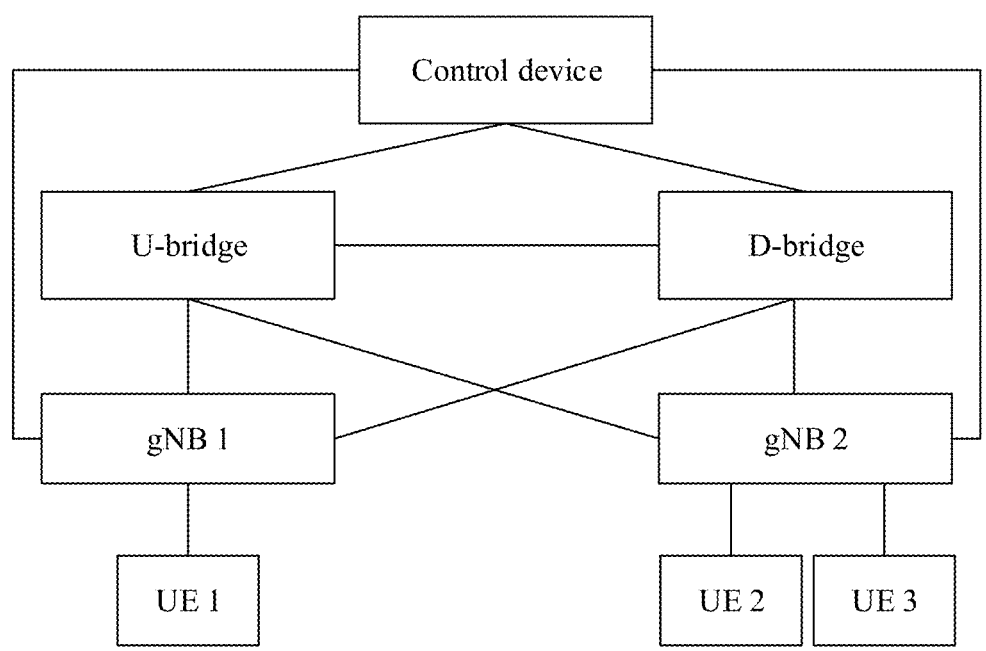
FIG. 16 is a schematic diagram of another example of a structure of a mobile network according to this application.

FIG. 16 shows a typical 5G deployment scenario in which a gNB has functions of both a U-BS and a D-BS. A U-bridge and a D-bridge are separately deployed as logical functions, and may be extended based on a logical function of a UPF. Bridge control is used as a control plane to configure the U-bridge, the D-bridge, and the gNB, and may be deployed as an independent logical function or extended based on a logical function of an SMF.

Figure 17:
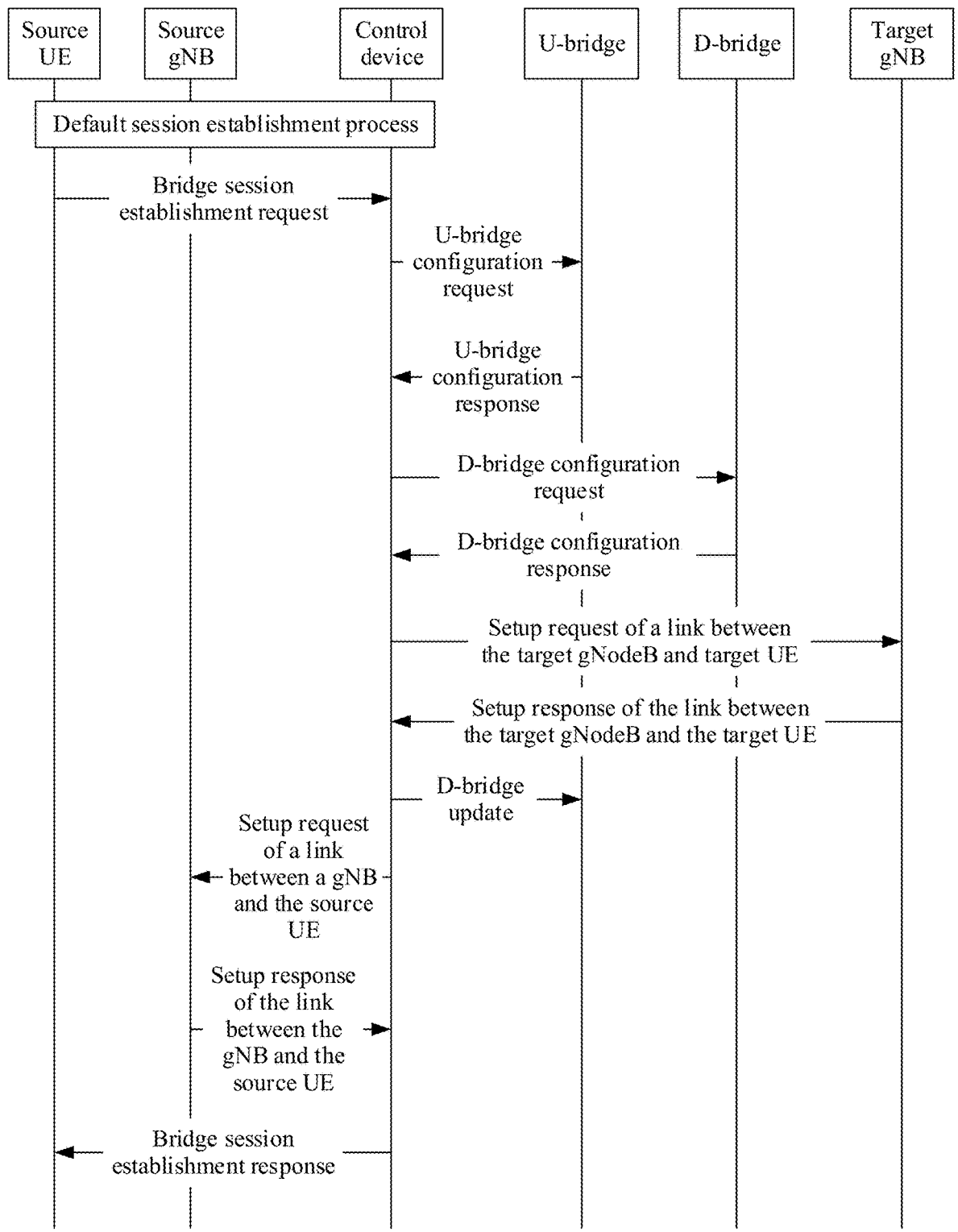
FIG. 17 is a schematic interaction diagram of still another example of a communication method according to this application.

FIG. 17 describes a process of establishing a bridge session (session) in the architecture in FIG. 16. To simplify description, for example, an AMF logical function is omitted in the figure, and signaling between the gNB and a controller (Bridge control) needs to be forwarded by using an AMF. In addition, the bridge control may need to first negotiate with a PCF to determine a user policy before responding to a user plane configuration, and a possible additional authentication and encryption process is omitted in FIG. 17. First, the UE needs to enter a connected state to activate a PDU session. The UE can access the Internet through the PDU session. A local low-latency and high-reliability communication service is triggered through negotiation with a higher-layer application server. An application layer process is not described in detail in this application.

Step (1) is being triggered by an application layer. A bottom-layer communications module of the UE sends abridge session establishment request (Bridge session establish req) message to the bridge control by using an established signaling connection of the gNB (the message may be forwarded by the AMF). The message may carry a type of a bridge service, and may be one of at least the following three types, type A: a surrounding broadcast type (bridged broadcasting); type B: a group communication type (bridged group communication); type C: a point-to-point communication type (bridged ptp). The message may also carry a service feature requirement of the bridge service, such as the transmission range and QoS requirements (including latency, reliability, a packet loss ratio, and a rate). For group communication, a group request for creating a group or joining a group may be carried, and an identifier corresponding to a to-be-joined group needs to be carried when the group is joined. Location information, for performing a service, of the UE may also be carried.

Step (2): After receiving the bridge session establishment request, the bridge control allocates a bridge identifier and/or a bridge group identifier to the UE based on a service type of a bridge session requested by the UE. The identifier may be link layer identifier information defined in a mobile network, or may be replaced with an IP address of an internal network. In addition, the bridge control may initiate a parameter configuration procedure with the U-bridge, and the bridge control may determine the U-bridge based on the service type of the bridge session or a location (for example, a cell, geographical coordinates, or location area information) of the UE. A U-bridge configuration request message may carry one of the following information: a type of the bridge service, bridge identifier information corresponding to the UE, a D-bridge bridge rule, interface transmission configuration information between the U-bridge and the gNB, interface transmission configuration information between the U-bridge and the D-bridge, QoS information of a service, and the like. A service bridge rule is a mapping rule between the target information and the D-bridge. If a corresponding service bridge rule is already configured on the U-bridge, the service bridge rule may not be configured. After receiving the U-bridge configuration request message, the U-bridge returns a U-bridge configuration response message, and the message may carry transmission configuration information of an interface between the U-bridge and the gNB and an interface between the U-bridge and the D-bridge.

Step (3): In a scenario in which the D-bridge and the U-bridge are separately deployed, the bridge control may initiate a process of configuring one or more D-bridges. If configuration of the D-bridge is already completed and the corresponding bridge D-bridge can be found according to the D-bridge bridge rule configured for the U-bridge, the D-bridge may not be configured. Generally, the D-bridge is responsible for one or more D-BS areas, and some D-BSs of different D-bridges may overlap. Configurations between the D-bridge and the D-BS and an overlapping relationship between the D-bridges belong to a network planning problem, and are not limited in this application. If a new D-bridge may need to be configured according to the service bridge rule configured for the U-bridge, the bridge control completes configuration by sending a D-bridge configuration message to a corresponding D-bridge, and the message includes at least one of the following information: configuration information of an interface between the U-bridge and the gNB, configuration information of an interface between the U-bridge and the D-bridge, a D-BS service bridging rule, interface transmission configuration information (used for unicast transmission) of one or more D-BSs (the gNB in this figure), a bridge group identifier that needs to be supported, a QoS type that needs to be supported, and the like.

Figure 18:
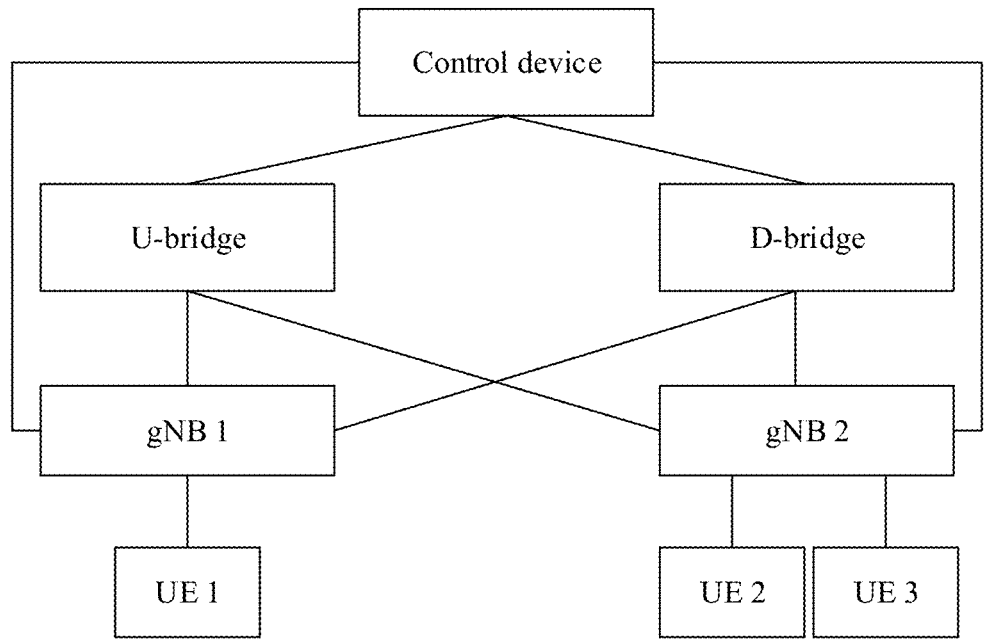
FIG. 18 is a schematic diagram of another example of a structure of a mobile network according to this application.

FIG. 18 shows a typical scenario in which a U-bridge and a D-bridge are co-deployed, and functions of the U-bridge and the D-bridge are combined to form an RGW node. Configuration processes of the U-bridge and D-bridge may be combined into one process.

Figure 19:
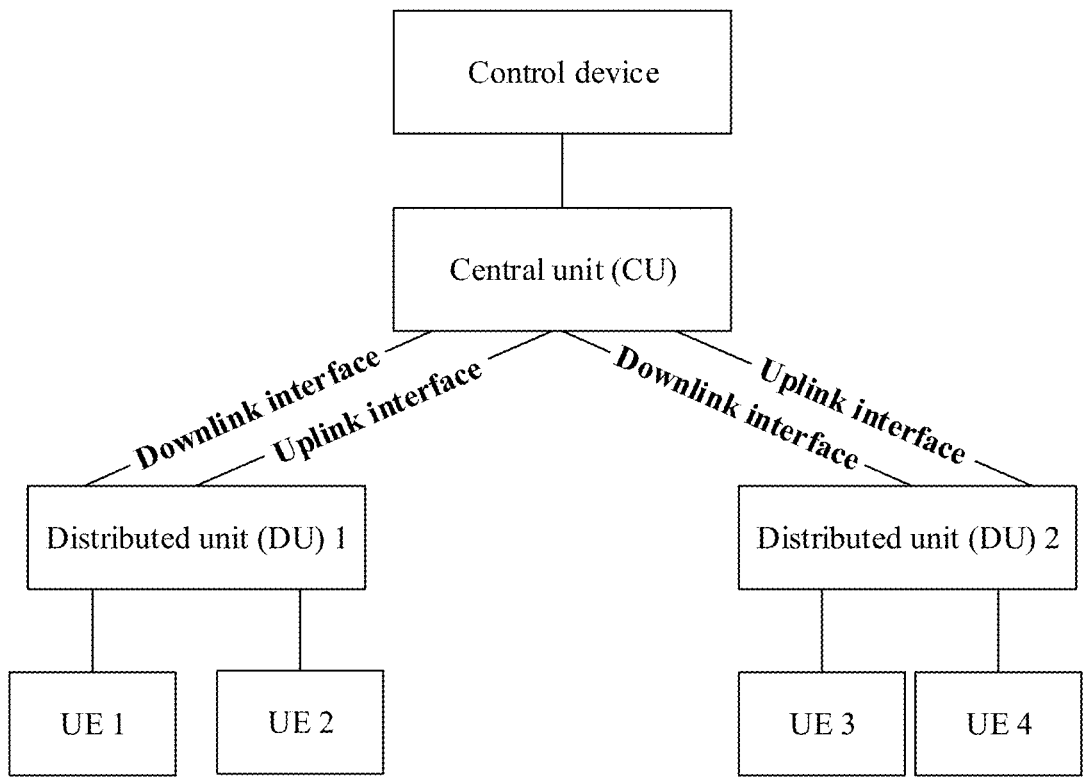
FIG. 19 is a schematic diagram of another example of a structure of a mobile network according to this application.

FIG. 19 shows a scenario in which a CU and an RGW of a higher layer protocol are combined after CU/DU separation of a gNB. In this case, a DU completes functions of a D-BS and a U-BS.

Figure 20:
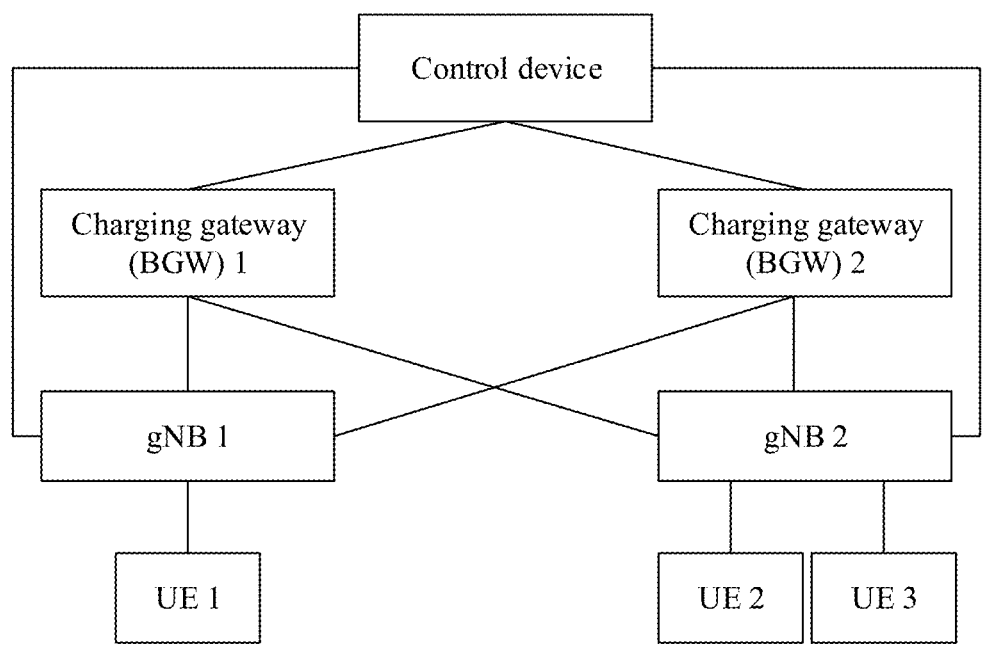
FIG. 20 is a schematic diagram of another example of a structure of a mobile network according to this application.

FIG. 20 shows a scenario in which a gNB and an RGW are integrated as a whole.

Step (4): The bridge control may also configure, by using an establishment request #1, a D-BS (that is, a gNB #2 in the figure) corresponding to the D-bridge. If a multicast mode is used, a transmission configuration includes a destination IP multicast address, a source IP address (an IP address of the D-bridge), and a downlink multicast tunnel identifier. If a unicast mode is used, only an IP address of the D-bridge and a tunnel identifier of the U-bridge need to be sent. Then, the D-BS makes a response. If the unicast mode is used, interface configuration information of the D-BS may also need to be carried. The bridge control updates the D-bridge by using a D-bridge update message. If the U-bridge corresponds to a plurality of D-bridges, (3) and (4) may be repeated.

Step (5): After completing configuration of the U-bridge, the D-bridge, and the corresponding D-BS, the bridge control may complete interface configuration of the U-BS and the U-bridge by using an establishment request response #1 message, and the message carries transmission configuration corresponding to the U-bridge interface, and further carries QoS information corresponding to a U-Uu and a bridge identifier of the UE. The U-BS returns a corresponding uplink interface transmission configuration by using an uplink interface setup request message. Optionally, a gNB (namely, the gNB #1) in which the UE is located is also a D-DS corresponding to the N-bridge. In this case, the bridge may implement, by using the process described in (4), configuration of a downlink interface corresponding to the gNB. Alternatively, configuration information in a corresponding downlink interface setup request may be sent to the gNB together with the uplink interface setup request.

Step (6): The bridge control sends a bridge session establishment response to the UE. The response carries a bridge (group) identifier of the UE and a possible UBAP/DBAP data packet format, including information that may be carried in a packet header. In addition, the gNB triggers an RRC configuration of a corresponding Uu interface to configure dedicated radio bearers of a corresponding U-Uu and D-Uu on the Uu. The U-Uu performs transmission based on a dedicated unicast bearer manner (an RRC message may carry a UE-specific air interface identifier), and the D-Uu may be a unicast bearer, a multicast bearer, or a broadcast bearer (an RRC message carries a corresponding air interface multicast identifier), and radio air interface video resource configurations of the corresponding U-Uu and D-Uu. Services with different QoS may be sent by using different radio bearers, and may be distinguished by using logical channels with different air interface configurations. Different QoS services sent in a multicast manner on the D-Uu may be distinguished by using an air interface multicast identifier.

For area multicast, the UE sends the UBAP PDU by using an uplink bridge dedicated radio bearer. In a UBAP header, source information is a bridge identifier of the UE, and target information is a multicast area indication that multicast is performed within a distance (for example, 100 m) specified by using the UE as a center. After receiving the UBAP PDU, the gNB sends the UBAP PDU to the U-bridge over an Nx interface. The U-bridge determines a corresponding D-bridge based on a location of the UE and a multicast range of a specified distance (for example, 100 m). Then, the D-bridge determines a corresponding multicast gNB based on Dst info of the D-bridge, and sends a corresponding PDU to the gNB in a multicast manner. Optionally, the PDU carries a synchronous sending time identifier. A plurality of gNBs send, on a corresponding multicast air interface channel based on the synchronous sending time identifier and by using a same air interface multicast identifier, data to UE within coverage of the gNBs for receiving.

For group multicast, the UE may carry a group identifier in dst info of an uplink UBAP header. If the UBAP does not carry the group identifier, the U-bridge may add the group identifier to the BAP. The U-bridge sends, based on information about a D-bridge in which a group member is located, the data to the corresponding D-bridge. The bridge control sends, when the U-bridge is configured, a bridge relationship of the D-bridge in which the group member is located. The bridge relationship is updated when a change occurs.

Figure 21:
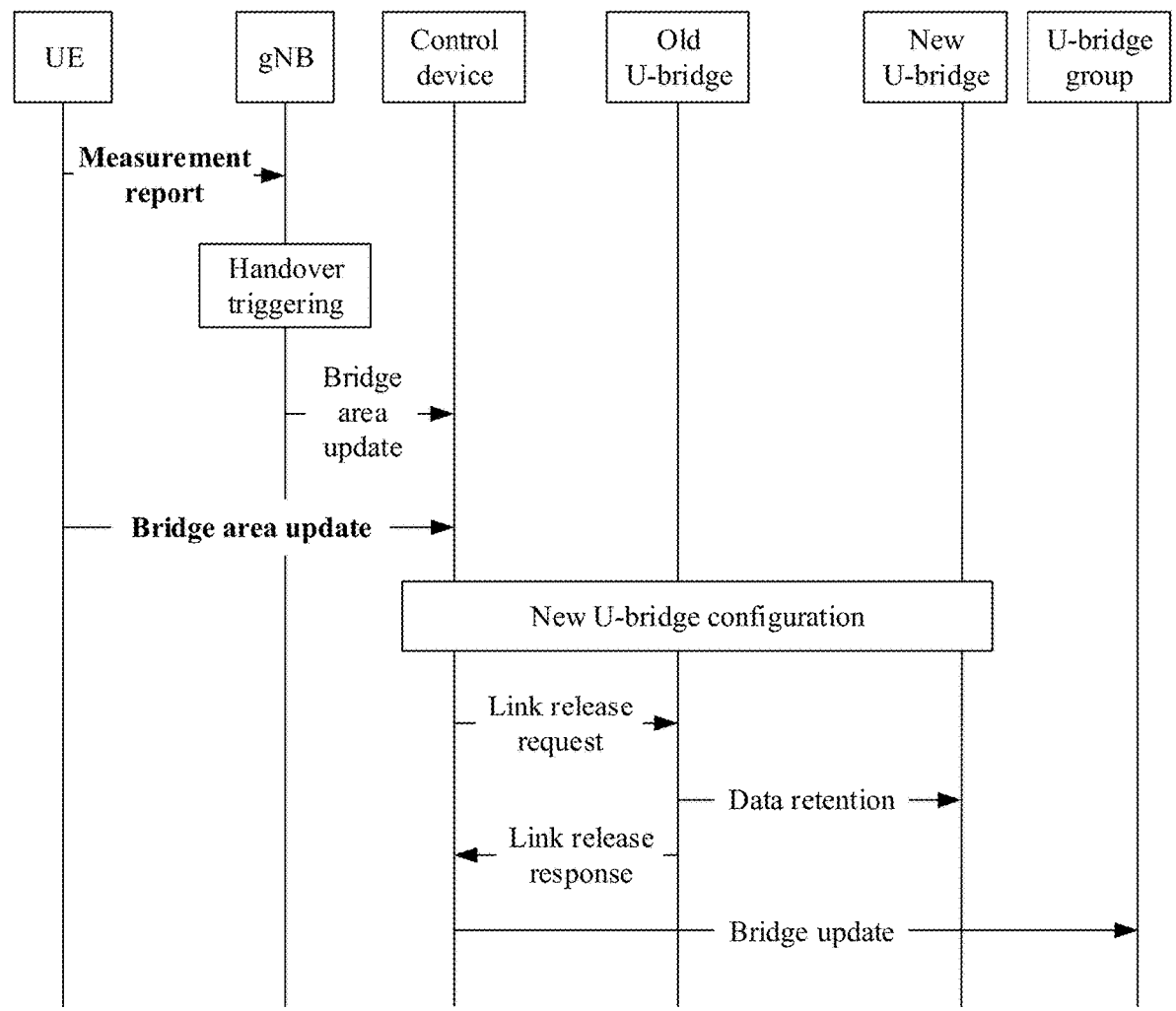
FIG. 21 is a schematic interaction diagram of still another example of a communication method according to this application.

FIG. 21 is a process of change of a U-bridge and update of a group bridge relationship when target information changes due to a handover. When one UE in a group of UEs moves, a base station for which the UE is responsible may be responsible for sending a bridge control, and a bridge area change indication. Usually, the UE sends a measurement report to a gNB, to report a new cell with better signal quality than a serving cell in which the UE is located. The gNB determines whether to initiate a handover to a cell with better signal quality. After determining that a handover is required, the gNB may send a bridge area update (bridge area update) message to the bridge control before a handover process occurs (for example, before a handover request is initiated to a new base station) or after a handover is completed (after a new base station indicates that the UE has accessed a cell served by the base station) to indicate change of a group bridge area. In another trigger mechanism, the UE directly notifies the bridge control, and when the UE considers that a cell or a location in which the UE is located changes, the UE notifies the bridge control by using a bridge area update message. The bridge control notifies, by using the bridge area update message, a U-bridge corresponding to a group that the bridge area needs to be updated, so that the UE can also receive bridge data of the group after reaching a new area. Optionally, if a new U-bridge needs to be added or an original U-bridge needs to be deleted due to movement of the UE, the bridge control performs control. If the U-bridge has data to be sent before update, the data may be forwarded to an updated U-bridge.

According to the solution in this embodiment of this application, the first forwarding device obtains, based on the information about the first terminal device, the information about the terminal device or the area to which the first data needs to be sent, so that the first forwarding device can send the first data to the terminal device or the area based on the information, so that the first forwarding device does not need to send the first data to a device such as a server configured to implement a routing and addressing function, thereby reducing a transmission latency.

Figure 22:
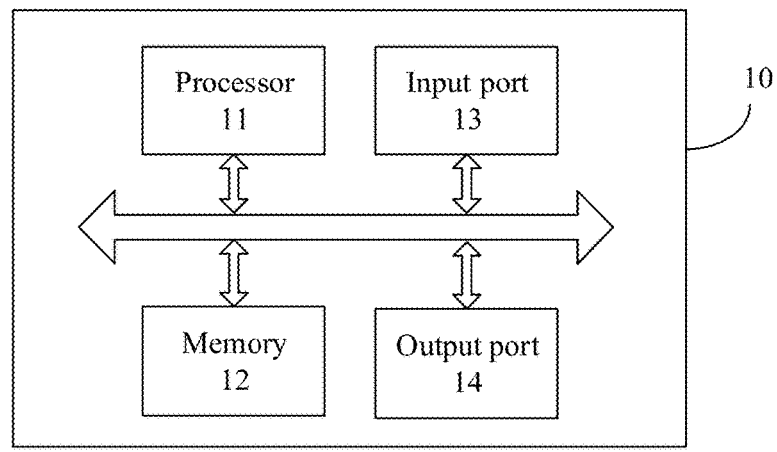
FIG. 22 is a schematic block diagram of an example of a communications apparatus according to an embodiment of this application.

According to the foregoing method, FIG. 22 is a first schematic diagram of a communications apparatus 10 according to an embodiment of this application. As shown in FIG. 22, the communications apparatus 10 may be a terminal device (for example, the terminal device #A or the terminal device #α), or may be a chip or a circuit, for example, a chip or a circuit that may be disposed in a terminal device. The terminal device may correspond to the terminal device in the foregoing method.

The communications apparatus 10 may include a processor 11 (that is, an example of a processing unit) and a memory 12. The memory 12 is configured to store an instruction. The processor 11 is configured to execute the instruction stored in the memory 12, so that the apparatus 20 implements the steps performed by the terminal device (for example, the terminal device #A or the terminal device #α) in the corresponding method shown in FIG. 2.

Further, the communications apparatus 10 may further include an input port 13 (that is, an example of a communications unit) and an output port 14 (that is, another example of the communications unit). Further, the processor 11, the memory 12, the input port 13, and the output port 14 may communicate with each other through an internal connection path, to transfer a control signal and/or a data signal. The memory 12 is configured to store a computer program. The processor 11 may be configured to invoke the computer program from the memory 12 and run the computer program, to control the input port 13 to receive a signal, and control the output port 14 to send a signal, to complete the steps performed by the terminal device in the foregoing method. The memory 12 may be integrated into the processor 11, or may be separated from the processor 11.

Optionally, if the communications apparatus 10 is a terminal device, the input port 13 is a receiver, and the output port 14 is a transmitter. The receiver and the transmitter may be one physical entity or different physical entities. If the receiver and the transmitter are a same physical entity, the receiver and the transmitter may be collectively referred to as a transceiver.

Optionally, if the communications device 10 is a chip or a circuit, the input port 13 is an input interface and the output port 14 is an output interface.

In an implementation, it may be considered that functions of the input port 13 and the output port 14 are implemented by using a transceiver circuit or a dedicated transceiver chip. It may be considered that the processor 11 is implemented by using a dedicated processing chip, a processing circuit, a processor, or a general-purpose chip.

In another implementation, it may be considered that the terminal device provided in this embodiment of this application is implemented by using a general-purpose computer. To be specific, program code for implementing functions of the processor 11, the input port 13, and the output port 14 is stored in the memory 12, and the general-purpose processor executes the code in the memory 12 to implement the functions of the processor 11, the input port 13, and the output port 14.

In this embodiment of this application, the processor 11 is configured to generate a first data packet, where the first data packet carries first data, the first data packet includes a target field, information carried in the target field is used to determine target information; the target information includes information about at least one second terminal device or information about a first area, the second terminal device is a terminal device to which the first data needs to be sent, and the first area is an area to which the first data needs to be broadcast; and the processor 11 is configured to send the first data packet to a first forwarding device in a mobile network by using the output port 14.

Optionally, the target field is located in a protocol data unit PDU at a first protocol layer corresponding to the first data packet; and the first protocol layer includes at least one of a packet data convergence protocol PDCP layer, a radio link control RLC layer, and a media access control MAC layer.

Optionally, the target field carries the target information.

Optionally, the information carried in the target field is empty or a specified preset value, the target information is determined by the first forwarding device based on information about the first terminal device, the information about the first terminal device includes at least one of context information of the first terminal device, location information of the first terminal device, and cell information of a cell in which the first terminal device is located.

Optionally, the information about the second terminal device includes a device identifier of the second terminal device or a group identifier of a terminal device group to which the second terminal device belongs.

Optionally, the information about the first area includes mobile network information of the first area or geographical location information of the first cell.

The foregoing listed functions and actions of the modules or units in the communications apparatus 10 are merely examples for description. The modules or units in the communications apparatus 10 may be configured to perform actions or processing processes performed by the terminal device in the method. To avoid repetition, detailed descriptions are omitted herein.

For concepts, explanations, and detailed descriptions used by the apparatus 10 and related to the technical solutions provided in this embodiment of this application and other steps, refer to the descriptions of the content in the foregoing method or other embodiments. Details are not described herein again.

Figure 23:
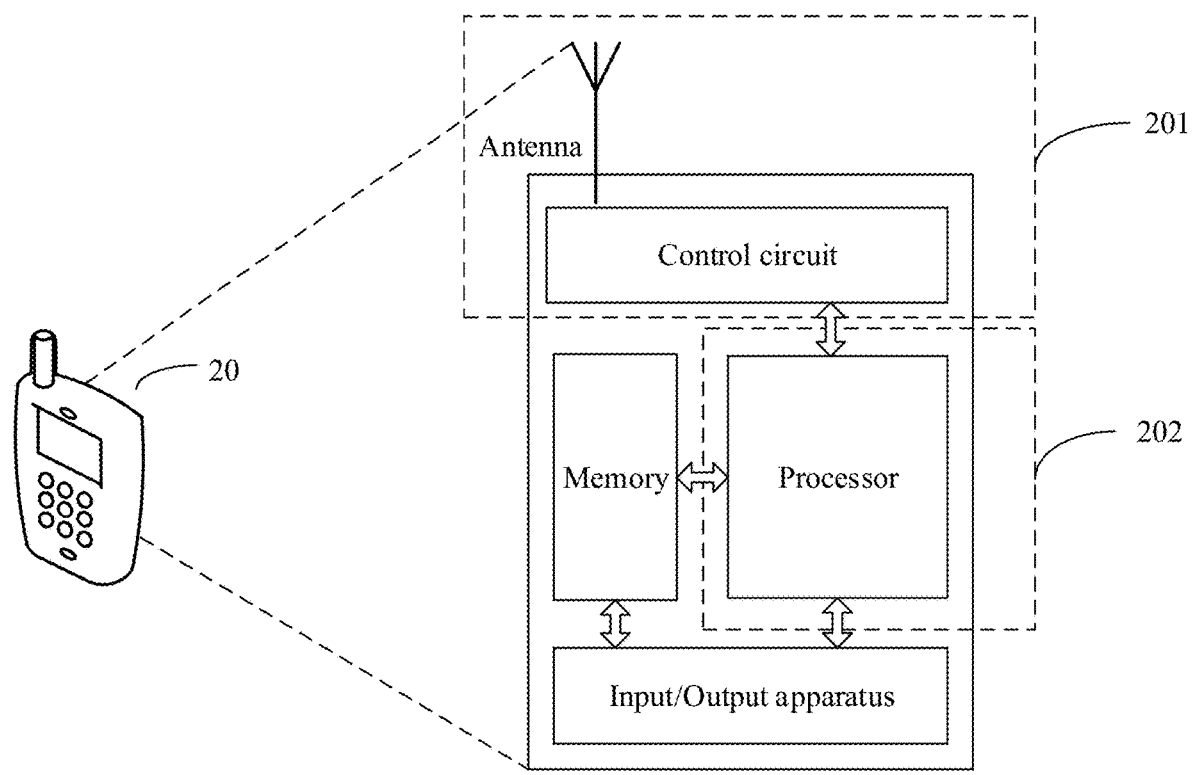
FIG. 23 shows a schematic structure of an example of a communications apparatus according to an embodiment of this application.

FIG. 23 is a schematic structural diagram of a terminal device 20 according to this application. For ease of description, FIG. 23 shows only main components of the terminal device. As shown in FIG. 23, the terminal device 20 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing an action described in the foregoing embodiments of the method for transmitting an indication of a precoding matrix. The memory is mainly configured to store a software program and data, for example, store a codebook described in the foregoing embodiments. The control circuit is mainly configured to perform conversion between a baseband signal and a radio frequency signal, and process the radio frequency signal. A combination of the control circuit and the antenna may also be referred to as a transceiver that is mainly configured to receive and transmit a radio frequency signal in an electromagnetic wave form. The input/output apparatus, such as a touchscreen, a display, or a keyboard, is mainly configured to: receive data input by a user and output data to the user.

After the terminal device is powered on, the processor may read a software program in a storage unit, explain and execute an instruction of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends the radio frequency signal by using the antenna in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 23 shows only one memory and only one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data. The central processing unit is mainly configured to control the entire terminal device, execute a software program, and process data of the software program. The processor in FIG. 23 integrates functions of the baseband processor and the central processing unit. A person skilled in the art may understand that the baseband processor and the central processing unit may be separate processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a software program form. The processor executes the software program, to implement a baseband processing function.

For example, in this embodiment of this application, an antenna and a control circuit that have a transceiver function may be considered as a transceiver unit 201 of the terminal device 20, and a processor having a processing function may be considered as a processing unit 202 of the terminal device 20. As shown in FIG. 23, the terminal device 20 includes the transceiver unit 201 and the processing unit 202. The transceiver unit may also be referred to as a transceiver, a transceiver machine, a transceiver apparatus, or the like. Optionally, a component that is in the transceiver unit 201 and that is configured to implement a receiving function may be considered as a receiving unit, and a component that is in the transceiver unit 201 and that is configured to implement a sending function may be considered as a sending unit. In other words, the transceiver unit 201 includes the receiving unit and the sending unit. For example, the receiving unit may also be referred to as a receiving machine, a receiver, a receiver circuit, or the like, and the sending unit may be referred to as a transmitting machine, a transmitter, a transmit circuit, or the like.

Figure 24:
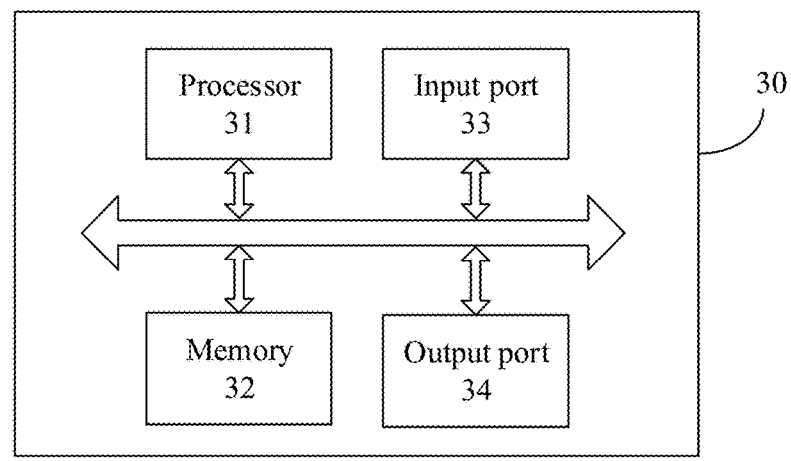
FIG. 24 is a schematic block diagram of another example of a communications apparatus according to an embodiment of this application.

According to the foregoing method, FIG. 24 is a second schematic diagram of a communications apparatus 30 according to an embodiment of this application. As shown in FIG. 24, the apparatus 30 may be a network device (for example, the network device #A), or may be a chip or a circuit, for example, a chip or a circuit that may be disposed in a network device. The network device corresponds to the forwarding device (for example, the access network device #A or the core network device #α) in the foregoing method.

The apparatus 30 may include a processor 31 (that is, an example of a processing unit) and a memory 32. The memory 32 is configured to store an instruction. The processor 31 is configured to execute the instruction stored in the memory 32, so that the apparatus 30 implements the steps performed by the forwarding device (for example, the access network device #A or the core network device #α) in the foregoing method.

Further, the apparatus 30 may further include an input port 33 (that is, an example of a communications unit) and an output port 33 (that is, another example of the processing unit). Still further, the processor 31, the memory 32, the input port 33, and the output port 34 may communicate with each other through an internal connection path, to transfer a control signal and/or a data signal. The memory 32 is configured to store a computer program. The processor 31 may be configured to invoke the computer program from the memory 32 and run the computer program, to control the input port 33 to receive a first data packet, where the first data packet carries first data from a first terminal device, the first data packet includes a target field, information carried in the target field is used to determine target information; the target information includes information about at least one second terminal device or information about a first area, the second terminal device is a terminal device to which the first data needs to be sent, and the first area is an area to which the first data needs to be broadcast; and the processor 31 is further configured to control the output port 34 to send a second data packet based on the target information, where the second data packet carries the first data.

Optionally, the target field is located in a protocol data unit PDU at a first protocol layer corresponding to the first data packet; and the first protocol layer includes at least one of a packet data convergence protocol PDCP layer, a radio link control RLC layer, and a media access control MAC layer.

Optionally, the target field carries the target information.

Optionally, when the information carried in the target field is empty or a specified preset value, the method further includes: determining, by the first forwarding device, the target information based on information about the first terminal device, where the information about the first terminal device includes at least one of context information of the first terminal device, location information of the first terminal device, and cell information of a cell in which the first terminal device is located.

Optionally, the information about the second terminal device includes a device identifier of the second terminal device or a group identifier of a terminal device group to which the second terminal device belongs.

Optionally, the information about the first area includes mobile network information of the first area or geographical location information of the first cell.

Optionally, the processor 31 is further configured to control the output port 34 to send the second data packet to a second forwarding device in the mobile network based on the target information, where the second forwarding device can communicate with the second terminal device, or coverage of the second forwarding device includes the first area.

Optionally, the processor 31 is further configured to encapsulate quality of service QoS information corresponding to the first data and/or sending time information of the first data into the second data packet.

Optionally, the processor 31 is further configured to determine, as the second forwarding device, a forwarding device that is indicated by configuration information and that serves the second terminal device, where the configuration information is used to indicate a terminal device served by each of a plurality of forwarding devices including the second forwarding device.

Optionally, the processor 31 is further configured to determine, as the second forwarding device, a forwarding device that is indicated by configuration information and whose coverage includes the first area, where the configuration information is used to indicate an area covered by each of a plurality of forwarding devices including the second forwarding device.

Optionally, the configuration information is obtained by the first apparatus 30 from a control device, the configuration information is determined by the control device based on status information reported by each of the plurality of forwarding devices, and the status information reported by each forwarding device is used to indicate a terminal device served by the forwarding device or an area covered by the forwarding device.

Optionally, a plurality of ports are configured in the apparatus 30, and each port is used for communication between the first forwarding device and at least one forwarding device. Optionally, the processor 31 is further configured to determine a first port from the plurality of ports based on the target information, where the first port is used for communication between the first forwarding device and the second forwarding device. Optionally, the processor 31 is further configured to control the output port 34 to send the second data packet to the second forwarding device through the first port.

Optionally, the apparatus 30 includes an access network device or a core network device in communication connection with the first terminal device.

In an implementation, it may be considered that functions of the input port 33 and the output port 34 are implemented by using a transceiver circuit or a dedicated transceiver chip. It may be considered that the processor 31 is implemented by using a dedicated processing chip, a processing circuit, a processor, or a general-purpose chip.

In another implementation, it may be considered that the network device provided in this embodiment of this application is implemented by using a general-purpose computer. To be specific, program code for implementing functions of the processor 31, the input port 33, and the output port 34 is stored in the memory, and the general-purpose processor executes the code in the memory to implement the functions of the processor 31, the input port 33, and the output port 34.

The foregoing listed functions and actions of the modules or units in the communications apparatus 30 are merely examples for description. The modules or units in the communications apparatus 30 may be configured to perform actions or processing processes performed by the forwarding device in the method. To avoid repetition, detailed descriptions are omitted herein.

For concepts, explanations, and detailed descriptions used by the apparatus 30 and related to the technical solutions provided in this embodiment of this application and other steps, refer to the descriptions of the content in the foregoing method or other embodiments. Details are not described herein again.

Figure 25:
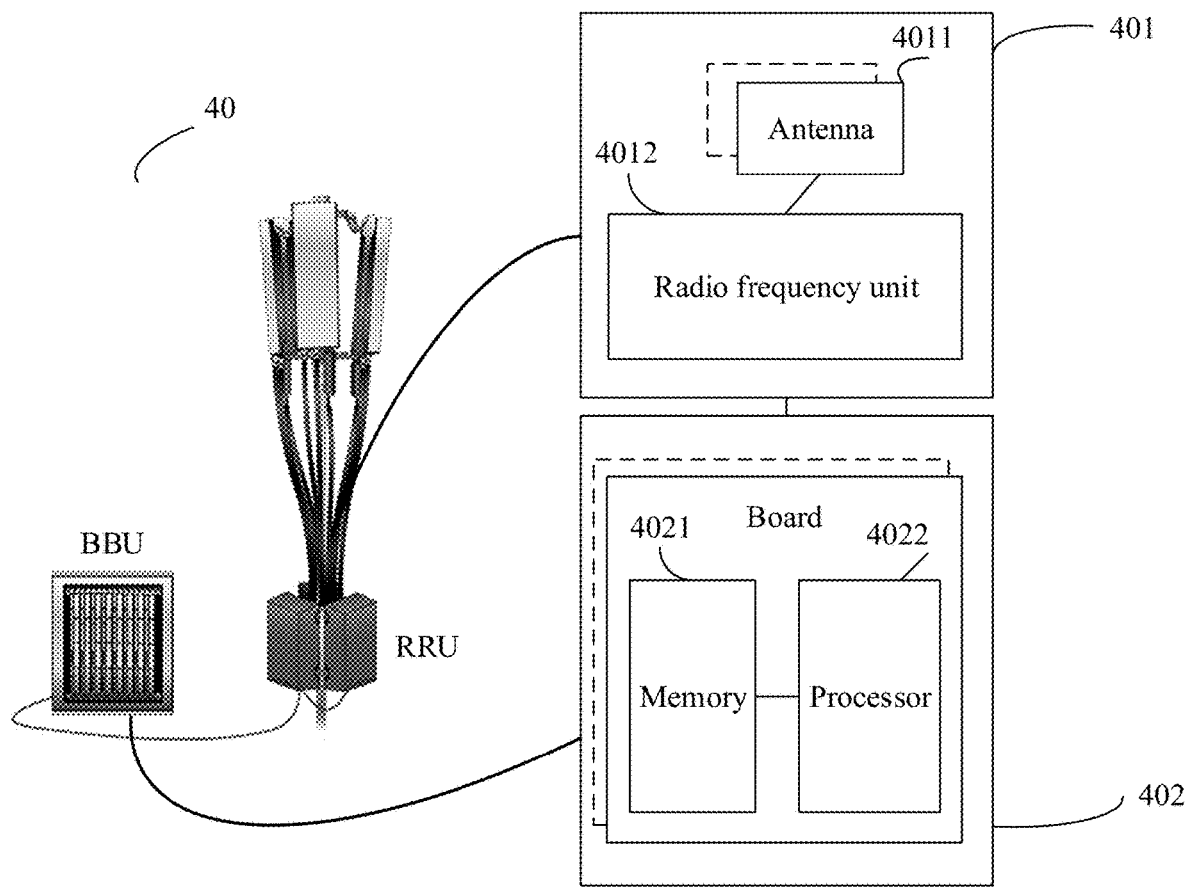
FIG. 25 shows a schematic structure of an example of a communications apparatus according to an embodiment of this application.

FIG. 25 is a schematic structural diagram of a forwarding device 40 according to an embodiment of this application. The forwarding device 40 may be configured to implement a function of the forwarding device (for example, the access network device #A or the core network device #α) in the foregoing method. The forwarding device 40 includes one or more radio frequency units, such as a remote radio unit (RRU) 401 and one or more baseband units (BBU) (also referred to as digital units, digital unit, DU) 402. The RRU 401 may be referred to as a transceiver unit, a transceiver machine, a transceiver circuit, a transceiver, or the like, and may include at least one antenna 4011 and a radio frequency unit 4012. The RRU 401 is mainly configured to receive and send a radio frequency signal and perform conversion between a radio frequency signal and a baseband signal, for example, configured to send the signaling message in the foregoing embodiments to a terminal device. The BBU 402 is mainly configured to: perform baseband processing, control the base station, and so on. The RRU 401 and the BBU 402 may be physically disposed together, or may be physically disposed separately, to be specific, may be on a distributed base station.

The BBU 402 is a control center of the base station, may also be referred to as a processing unit, and is mainly configured to implement a baseband processing function, for example, channel coding, multiplexing, modulation, and spreading. For example, the BBU (the processing unit) 402 may be configured to control the base station 40 to perform the operation procedure related to the network device in the foregoing method embodiments.

In an example, the BBU 402 may include one or more boards, and a plurality of boards may together support a radio access network (for example, an LTE system, or a 5G system) of a single access standard, or may separately support radio access networks of different access standards. The BBU 402 further includes a memory 4021 and a processor 4022. The memory 4021 is configured to store a necessary instruction and necessary data. For example, the memory 4021 stores the codebook and the like in the foregoing embodiments. The processor 4022 is configured to control the base station to perform a necessary action. For example, the processor 4022 is configured to control the base station to perform the operation procedure related to the network device in the foregoing method embodiments. The memory 4021 and the processor 4022 may serve one or more boards. In other words, a memory and a processor may be independently disposed on each board. Alternatively, a plurality of boards may share a same memory and a same processor. In addition, a necessary circuit may be disposed on each board.

In a possible implementation, with development of a system-on-chip SoC) technology, all or some functions of the components 402 and 401 may be implemented by using the SoC technology, for example, implemented by using one base station function chip. The base station function chip integrates components such as a processor, a memory, and an antenna port. A program of a base station-related function is stored in the memory. The processor executes the program to implement the base station-related function. Optionally, the base station function chip can also read a memory outside the chip to implement the base station-related function.

It should be understood that the structure of the base station shown in FIG. 25 is merely a possible form, but should not constitute any limitation on this embodiment of this application. In this application, a possibility that there may be a base station structure in another form in the future is not excluded.

According to the method provided in embodiments of this application, an embodiment of this application further provides a communications system, including the foregoing network device and one or more terminal devices.

It should be understood that, in this embodiment of this application, the processor may be a central processing unit (CPU), another general purpose processor, a digital signal processor (DSP), an application-specific integrated circuit (ASIC), a field programmable gate array (FPGA), another programmable logical device, a discrete gate, a transistor logical device, a discrete hardware component, or the like. The general purpose processor may be a microprocessor, or may be any conventional processor or the like.

It may further be understood that the memory in this embodiment of this application may be a volatile memory or a non-volatile memory, or may include a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example, but not limitation, many forms of random access memories (RAM) are available, such as a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When the software is used to implement the embodiments, all or some of the foregoing embodiments may be implemented in a form of a computer program product. The computer program product includes one or more computer instructions or computer programs. When the computer instructions or the computer programs are loaded or executed on a computer, all or some of the procedures or functions according to the embodiments of this application are generated. The computer may be a general-purpose computer, a special-purpose computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium, or the like. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application. It may be clearly understood by a person skilled in the art that, for convenient and brief description, for a detailed working process of the foregoing system, apparatus, and unit, refer to a corresponding process in the foregoing method embodiments, and details are not described herein again. In the several embodiments provided in this application, it should be understood that the disclosed system, apparatus, and methods may be implemented in another manner. For example, the described apparatus embodiments are merely examples. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions in the embodiments. In addition, function units in the embodiments of this application may be integrated into one processing unit, or each of the units may exist alone physically, or two or more units may be integrated into one unit. When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit a protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
receiving, by a first forwarding device in a mobile network, a first data packet, wherein the first data packet carries first data from a first terminal device, the first data packet comprises a target field, and information carried in the target field is used to determine target information, wherein the target information comprises information about at least one second terminal device or information about a first area, the second terminal device is a terminal device to which the first data is to be sent, and the first area is an area to which the first data is to be broadcast; and
sending, by the first forwarding device, a second data packet based on the target information, wherein the second data packet carries the first data,
wherein the target field carries the target information; and when the information carried in the target field is empty or a specified preset value, the method further comprises: determining, by the first forwarding device, the target information based on information about the first terminal device, wherein the information about the first terminal device comprises at least one of context information of the first terminal device, location information of the first terminal device, and cell information of a cell in which the first terminal device is located.

2. The communication method according to claim 1, wherein the target field is located in a protocol data unit (PDU) at a first protocol layer corresponding to the first data packet, and wherein the first protocol layer comprises at least one of a packet data convergence protocol (PDCP) layer, a radio link control (RLC) layer, and a media access control (MAC) layer.

3. The communication method according to claim 1, wherein the information about the second terminal device comprises a device identifier of the second terminal device or a group identifier of a terminal device group to which the second terminal device belongs; and
the information about the first area comprises mobile network information of the first area or geographical location information of the first cell.

4. The communication method according to claim 1, wherein the sending, by the first forwarding device, the second data packet based on the target information comprises:
sending, by the first forwarding device, the second data packet to a second forwarding device in the mobile network based on the target information, wherein the second forwarding device can communicate with the second terminal device, or coverage of the second forwarding device comprises the first area.

5. The communication method according to claim 4, wherein before the sending, by the first forwarding device, the second data packet to the second forwarding device in the mobile network based on the target information, the method further comprises:
encapsulating, by the first forwarding device, quality of service (QoS) information corresponding to the first data and/or sending time information of the first data into the second data packet.

6. The communication method according to claim 4, wherein before the sending, by the first forwarding device, the second data packet based on the target information, the method further comprises:
determining, by the first forwarding device as the second forwarding device, a forwarding device that is indicated by configuration information and that serves the second terminal device, wherein the configuration information indicates a terminal device served by each of a plurality of forwarding devices comprising the second forwarding device; or
determining, by the first forwarding device as the second forwarding device, a forwarding device that is indicated by configuration information and whose coverage comprises the first area, wherein the configuration information indicates an area covered by each of a plurality of forwarding devices comprising the second forwarding device.

7. The communication method according to claim 6, wherein the configuration information is obtained by the first forwarding device from a control device, the configuration information is determined by the control device based on status information reported by each of the plurality of forwarding devices, and the status information reported by each forwarding device is used to indicate a terminal device served by the forwarding device or an area covered by the forwarding device.

8. The communication method according to claim 4, wherein a plurality of ports are configured in the first forwarding device, and each port is used for communication between the first forwarding device and at least one forwarding device; and the sending, by the first forwarding device, the second data packet to the second forwarding device in the mobile network based on the target information comprises:

determining, by the first forwarding device, a first port from the plurality of ports based on the target information, wherein the first port is used for communication between the first forwarding device and the second forwarding device; and sending, by the first forwarding device, the second data packet to the second forwarding device through the first port.

9. The communication method according to claim 1, wherein the first forwarding device comprises an access network device or a core network device in communication connection with the first terminal device.

10. A communication method, comprising:

generating, by a first terminal device, a first data packet, wherein the first data packet carries first data, the first data packet comprises a target field, and information carried in the target field is used to determine target information, wherein the target information comprises information about at least one second terminal device or information about a first area, the second terminal device is a terminal device to which the first data is to be sent, and the first area is an area to which the first data is to be broadcast; and sending, by the first terminal device, the first data packet to a first forwarding device in a mobile network, wherein the target field carries the target information; and when the information carried in the target field is empty or a specified preset value, the target information is determined by the first forwarding device based on information about the first terminal device, the information about the first terminal device comprises at least one of context information of the first terminal device, location information of the first terminal device, and cell information of a cell in which the first terminal device is located.

11. The communication method according to claim 10, wherein the target field is located in a protocol data unit (PDU) at a first protocol layer corresponding to the first data packet, and wherein the first protocol layer comprises at least one of a packet data convergence protocol (PDCP) layer, a radio link control (RLC) layer, and a media access control (MAC) layer.

12. The communication method according to claim 10, wherein the target field carries the target information; or the information carried in the target field is empty or a specified preset value, and the target information is determined by the first forwarding device based on information about the first terminal device, the information about the first terminal device comprises at least one of context information of the first terminal device, location information of the first terminal device, and cell information of a cell in which the first terminal device is located.

13. The communication method according to claim 10, wherein the information about the second terminal device comprises a device identifier of the second terminal device or a group identifier of a terminal device group to which the second terminal device belongs; and the information about the first area comprises mobile network information of the first area or geographical location information of the first cell.

14. A communications device, comprising:

a processing unit configured to generate a first data packet, wherein the first data packet carries first data, the first data packet comprises a target field, and information carried in the target field is used to determine target information, wherein the target information comprises information about at least one second terminal device or information about a first area, the second terminal device is a terminal device to which the first data is to be sent, and the first area is an area to which the first data is to be broadcast; and a transceiver unit configured to send the first data packet to a first forwarding device in a mobile network, wherein the target field carries the target information; and when the information carried in the target field is empty or a specified preset value, the target information is determined by the first forwarding device based on information about a first terminal device, the information about the first terminal device comprises at least one of context information of the first terminal device, location information of the first terminal device, and cell information of a cell in which the first terminal device is located.

15. The communications device according to claim 14, wherein the target field is located in a protocol data unit (PDU) at a first protocol layer corresponding to the first data packet, and wherein the first protocol layer comprises at least one of a packet data convergence protocol (PDCP) layer, a radio link control (RLC) layer, and a media access control (MAC) layer.

16. The communications device according to claim 14, wherein the information about the second terminal device comprises a device identifier of the second terminal device or a group identifier of a terminal device group to which the second terminal device belongs; and the information about the first area comprises mobile network information of the first area or geographical location information of the first cell.

* * * * *